United States Patent
Puskar-Pasewicz et al.

(10) Patent No.: US 7,766,106 B2
(45) Date of Patent: Aug. 3, 2010

(54) POWERED WHEELCHAIR CONFIGURATIONS AND RELATED METHODS OF USE

(75) Inventors: John Puskar-Pasewicz, Shavertown, PA (US); Kip D. Alder, West Pittston, PA (US)

(73) Assignee: Pride Mobility Products Corporation, Exeter, PA (US)

( * ) Notice: Subject to any disclaimer, the term of this patent is extended or adjusted under 35 U.S.C. 154(b) by 610 days.

(21) Appl. No.: 11/486,638

(22) Filed: Jul. 14, 2006

(65) Prior Publication Data

US 2007/0107955 A1    May 17, 2007

Related U.S. Application Data

(60) Provisional application No. 60/727,537, filed on Oct. 17, 2005, provisional application No. 60/699,201, filed on Jul. 14, 2005.

(51) Int. Cl.
B60K 1/00    (2006.01)
(52) U.S. Cl. ............ 180/65.1; 180/308; 180/907; 180/6.5; 180/24.02; 180/DIG. 4
(58) Field of Classification Search ............ 180/65.1, 180/6.48, 6.5, 24.02, 24.06, 24.07, 308, 907; 180/21, 22, 8.1, 8.2, 8.3, 8.4, 8.5, 8.6, 8.7; 297/DIG. 4; 280/5.2, 5.22, 5.28
See application file for complete search history.

(56) References Cited

U.S. PATENT DOCUMENTS

| 3,104,112 | A | | 9/1963 | Crait | |
|---|---|---|---|---|---|
| 3,213,957 | A | * | 10/1965 | Wrigley | ............ 180/208 |
| 3,520,378 | A | | 7/1970 | Slay | |
| 3,794,132 | A | | 2/1974 | Moon | |
| 3,807,520 | A | | 4/1974 | Chisholm | |
| 3,827,718 | A | | 8/1974 | Curry | |
| 3,938,608 | A | | 2/1976 | Folco-Zambelli | |
| 3,952,822 | A | | 4/1976 | Udden | |
| 4,000,912 | A | | 1/1977 | Donald et al. | ............ 280/701 |
| 4,128,137 | A | | 12/1978 | Booth | ............ 180/6.5 |
| 4,245,847 | A | | 1/1981 | Knott | |
| 4,513,832 | A | | 4/1985 | Engman | ............ 180/6.5 |

(Continued)

FOREIGN PATENT DOCUMENTS

EP    1 142 548 A2    10/2001

(Continued)

OTHER PUBLICATIONS

English Abstract of French Patent FR2399822 Granted on Mar. 9, 1979.

*Primary Examiner*—Paul N. Dickson
*Assistant Examiner*—Bryan A Evans
(74) *Attorney, Agent, or Firm*—Woodcock Washburn LLP

(57) ABSTRACT

A wheelchair includes a frame, a chair, a pair of drive wheels, a pair of rear wheels, and a pair of front wheels. Each front wheel is part of a front arm assembly that is rigidly coupled to a drive via a mounting plate. The mounting plate is connected to the wheelchair frame by a pivot. The drives are transversely mounted. The batteries are disposed rearward of the drives. The wheelchair seat can be moved forward to provide access to the batteries without fully removing the wheelchair from the frame.

51 Claims, 27 Drawing Sheets

U.S. PATENT DOCUMENTS

| | | | |
|---|---|---|---|
| 4,566,551 A * | 1/1986 | Feliz | 180/9.1 |
| 4,840,394 A * | 6/1989 | Bickler | 280/677 |
| 5,094,310 A | 3/1992 | Richey et al. | 180/65.6 |
| 5,156,226 A | 10/1992 | Boyer | |
| 5,275,248 A * | 1/1994 | Finch et al. | 180/65.6 |
| 5,435,404 A * | 7/1995 | Garin, III | 180/6.5 |
| 5,540,297 A | 7/1996 | Meier | 180/65.5 |
| 5,564,512 A | 10/1996 | Scheuderman | 180/65.5 |
| 5,778,996 A | 7/1998 | Prior et al. | |
| D397,645 S | 9/1998 | Schaffner | |
| 5,848,658 A | 12/1998 | Pulver | |
| 5,855,387 A | 1/1999 | Gill et al. | |
| 5,944,131 A | 8/1999 | Schaffner | |
| 5,964,473 A | 10/1999 | Degonda et al. | 280/250.1 |
| 6,047,979 A | 4/2000 | Kraft et al. | |
| 6,070,898 A | 6/2000 | Dickie et al. | |
| 6,129,165 A * | 10/2000 | Schaffner et al. | 180/65.1 |
| 6,135,222 A | 10/2000 | Furukawa | 180/65.5 |
| 6,176,335 B1 | 1/2001 | Schaffner | |
| 6,196,343 B1 | 3/2001 | Strautnieks | |
| 6,199,647 B1 | 3/2001 | Schafner | 180/65.1 |
| 6,202,773 B1 | 3/2001 | Richey, II et al. | |
| 6,220,382 B1 | 4/2001 | Kramer, Jr. et al. | 180/65.5 |
| 6,234,507 B1 | 5/2001 | Dickie | |
| 6,341,657 B1 | 1/2002 | Hopely, Jr. et al. | 180/6.5 |
| 6,357,793 B1 | 3/2002 | Dickie et al. | |
| 6,375,209 B1 * | 4/2002 | Schlangen | 280/250.1 |
| 6,460,641 B1 | 10/2002 | Kral | |
| 6,494,474 B1 * | 12/2002 | Kramer, Jr. | 280/304.1 |
| 6,533,306 B2 | 3/2003 | Watkins | |
| 6,543,798 B2 | 4/2003 | Schaffner et al. | |
| 6,554,086 B1 * | 4/2003 | Goertzen et al. | 180/65.1 |
| 6,640,916 B2 | 11/2003 | Schaffner | |
| 6,705,629 B2 | 3/2004 | Post et al. | |
| 6,752,230 B1 | 6/2004 | Huang | |
| 6,769,503 B2 | 8/2004 | Cheng | |
| 6,796,568 B2 | 9/2004 | Martis et al. | 280/124.111 |
| 6,851,711 B2 | 2/2005 | Goertzen et al. | |
| 6,923,278 B2 | 8/2005 | Mulhern | |
| 7,021,641 B2 | 4/2006 | Wu | |
| 7,040,429 B2 | 5/2006 | Molnar | |
| 7,066,290 B2 | 6/2006 | Fought | |
| 7,083,195 B2 | 8/2006 | Goertzen et al. | |
| 7,104,346 B2 | 9/2006 | Schaffner | |
| 7,344,155 B2 | 3/2008 | Mulhern et al. | |
| 7,380,824 B2 | 6/2008 | Chen et al. | |
| 7,389,835 B2 | 6/2008 | Mulhern | |
| 7,413,038 B2 | 8/2008 | Mulhern et al. | |
| 7,506,709 B2 | 3/2009 | Kiwak et al. | |
| 2001/0011613 A1 | 8/2001 | Schaffner | 180/65.1 |
| 2002/0093172 A1 | 7/2002 | Watkins | |
| 2003/0075365 A1 * | 4/2003 | Fought | 180/6.5 |
| 2003/0089537 A1 | 5/2003 | Sinclair | |
| 2004/0004342 A1 | 1/2004 | Mulhern et al. | |
| 2004/0035627 A1 | 2/2004 | Richey et al. | |
| 2004/0046358 A1 | 3/2004 | White et al. | |
| 2004/0060748 A1 | 4/2004 | Molnar | |
| 2004/0168839 A1 | 9/2004 | Wu | |
| 2004/0251063 A1 | 12/2004 | Patterson | |
| 2004/0251649 A1 | 12/2004 | Wu | |
| 2004/0262859 A1 | 12/2004 | Turturiello et al. | |
| 2005/0000742 A1 | 1/2005 | Mulhern et al. | |
| 2005/0077714 A1 | 4/2005 | Mulhern et al. | |
| 2005/0077715 A1 | 4/2005 | Mulhern | 280/755 |
| 2005/0127631 A1 | 6/2005 | Schaffner | |
| 2005/0206149 A1 | 9/2005 | Mulhern et al. | |
| 2006/0022445 A1 | 2/2006 | Mulhern | |
| 2006/0076747 A1 | 4/2006 | Pauls et al. | |
| 2006/0076748 A1 | 4/2006 | Pauls et al. | |
| 2006/0082117 A1 | 4/2006 | Turturiello et al. | |
| 2006/0086554 A1 | 4/2006 | Jackson et al. | |
| 2007/0181353 A1 | 8/2007 | Puskar-Pasewicz et al. | |

FOREIGN PATENT DOCUMENTS

| | | |
|---|---|---|
| EP | 1 493 418 A1 | 1/2005 |
| EP | 1 522 294 A2 | 4/2005 |
| EP | 1522295 A2 | 4/2005 |
| FR | 2215054 | 3/1974 |
| FR | 2399822 | 3/1979 |
| GB | 2051702 | 5/1980 |
| GB | 2192595 | 7/1986 |
| JP | 2001/104391 | 4/2001 |
| WO | WO 87/06205 | 4/1987 |
| WO | WO 90/06097 | 6/1990 |
| WO | WO 00/08910 | 2/2000 |
| WO | WO 00/54718 | 9/2000 |
| WO | WO 02/34190 A2 | 5/2002 |

* cited by examiner

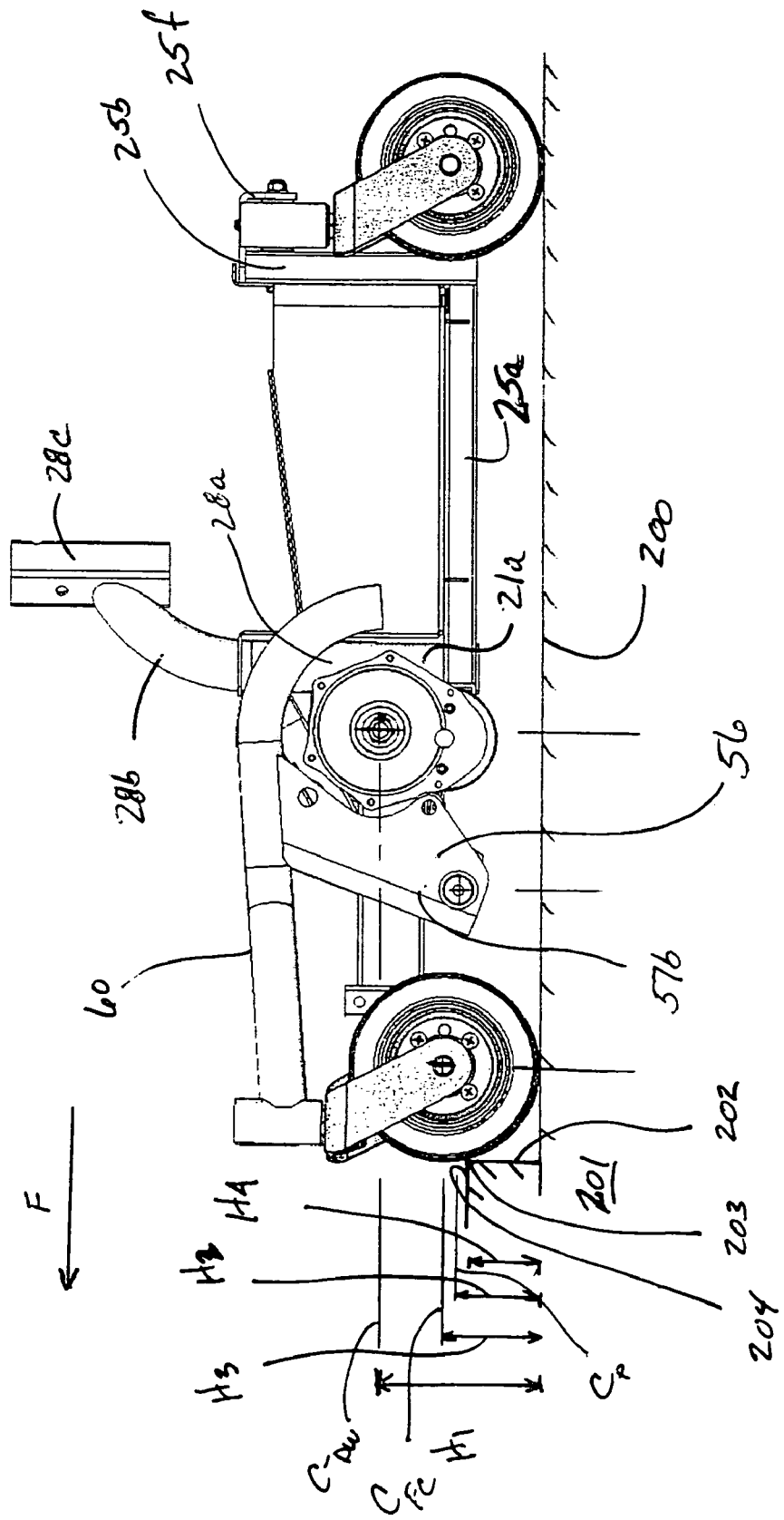

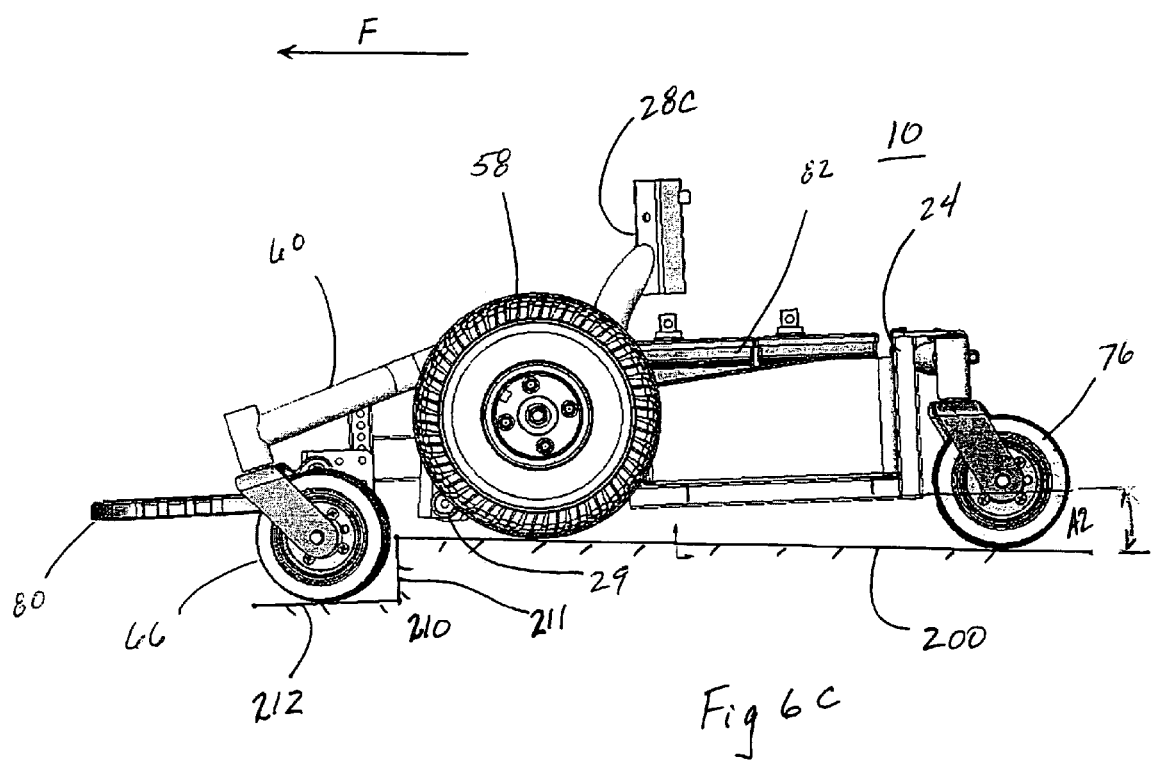

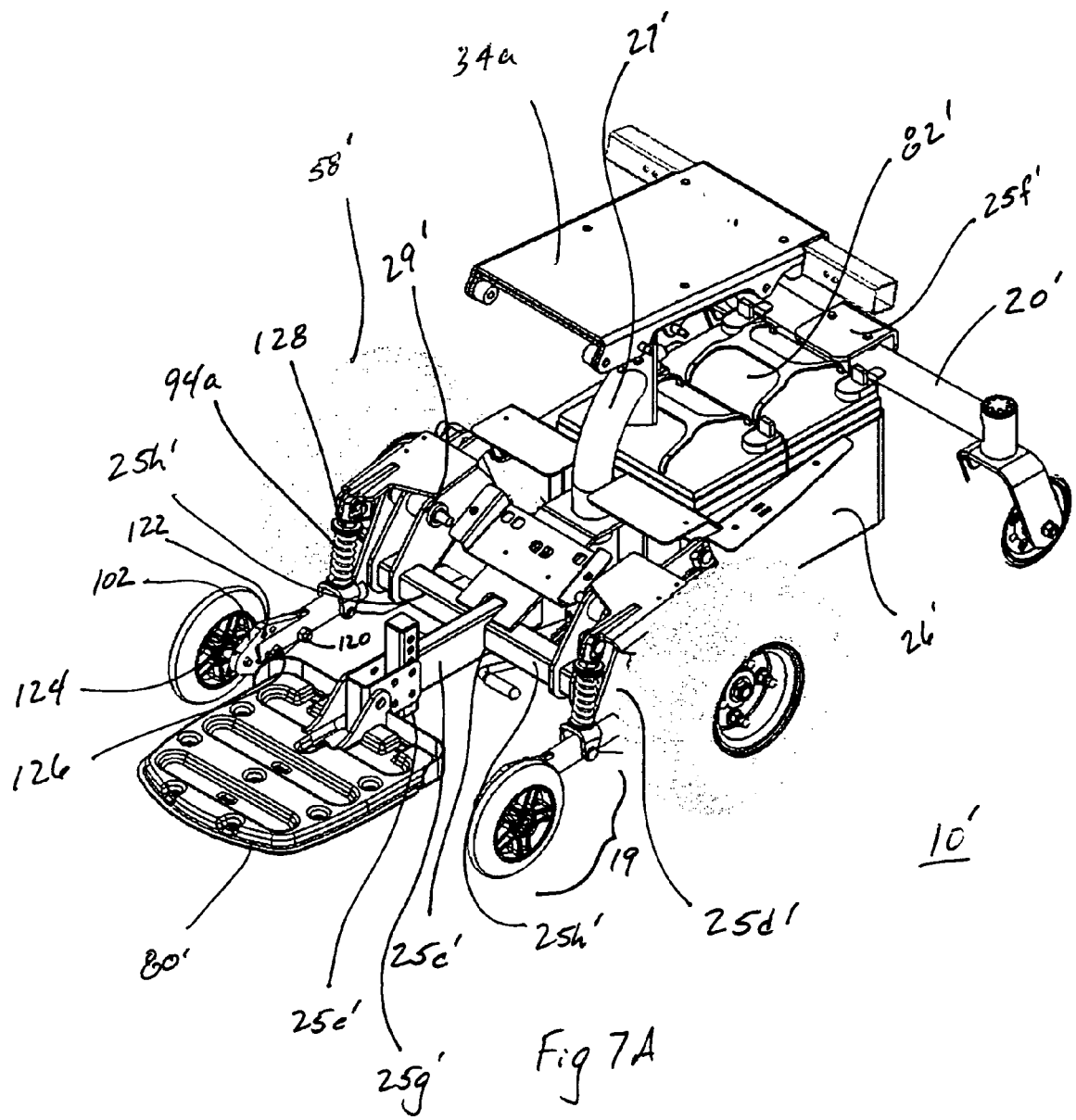

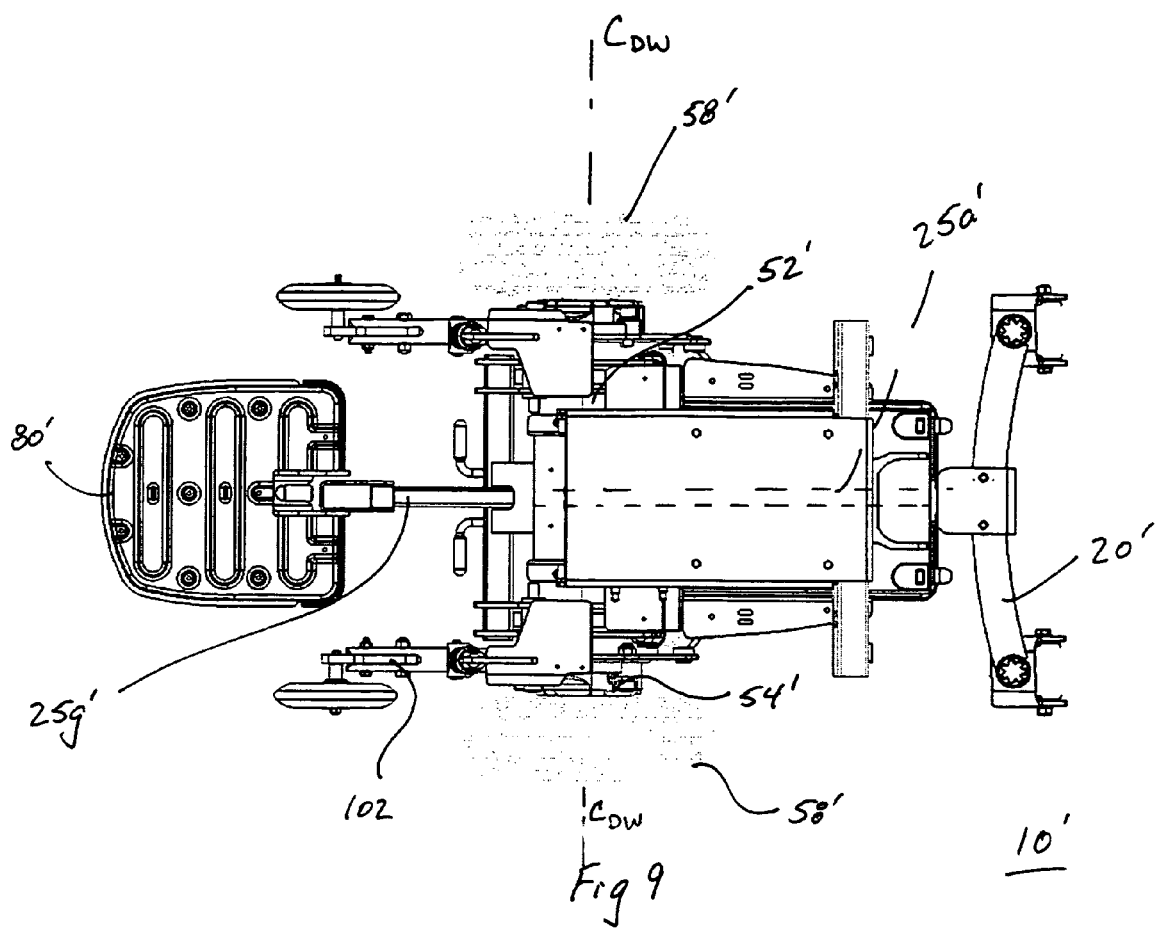

POWERED WHEELCHAIR CONFIGURATIONS AND RELATED METHODS OF USE

CROSS-REFERENCE TO RELATED APPLICATIONS

This application claims priority under 35 U.S.C. §119(e) to U.S. provisional application No. 60/699,201 filed Jul. 14, 2005 and provisional application No. 60/727,537 filed Oct. 17, 2005, which are incorporated by reference herein in their entireties.

FIELD OF THE INVENTION

The present invention relates to powered wheelchairs, and more specifically to wheelchair configurations that are capable of assisting in curb-climbing.

BACKGROUND OF THE INVENTION

Powered wheelchairs often have six wheels including a pair of center wheels, a pair of rear wheels, and a pair of front wheels. Typically, one pair of wheels is driven by, and directly connected to, a drive. The front wheels may be suspended above the ground plane on which the wheelchair rests or in contact with the ground. Typically, wheels that are spaced apart from the ground surface, or configured to only lightly contact the ground surface, are fixed except for the capability of turning about their axes of rotation; such wheels are referred to herein as "fixed wheels." Wheels that are configured to ride on the ground surface during normal operation typically have the capability to swivel about a vertical axis; such wheels are referred to herein as "casters."

Wheelchairs that employ fixed wheels often employ springs to suspend the fixed wheels above the ground at the end of forward extending arms. The fixed wheels are the first part of the wheelchair that contact a curb, and the fixed wheels are often configured to ride over a curb.

Wheelchairs that employ casters often are disposed on forward-extending arms that are coupled to the frame at a pivot. Some wheelchairs, such as those employing an Active-Track™ suspension, available on some powered wheelchairs from Pride Mobility Products Corporation, have pivoting front caster arms that raise or are upwardly biased in response to wheelchair acceleration or motor torque to enhance the capability of the wheelchair to climb curbs. Pivotable front caster arms typically employ biasing springs to provide a downward force that is balanced against the drive's capability to raise the casters for ascending a curb and that urges the casters downward to contact the lower ground surface while descending a curb.

Wheelchairs typically have a frame onto which loads from the passenger and the wheelchair's batteries are applied. To properly distribute the load between the center wheels and the rear casters (and where applicable the front casters) and to enhance stability of the wheelchair, loads from the batteries and passenger typically are applied between the axis of rotation of the center wheels and the rear casters, especially where the center wheels are the drive wheels. Often, the batteries are located such that the center of gravity of the batteries is near, but rearward of, the center drive wheels or in general near the center of the wheelchair. To accommodate the battery location, the drive for each drive wheel typically includes a longitudinally oriented (that is, oriented parallel to the axis of straight-ahead movement of the wheelchair) motor and a right-angle gearbox. An exception to such drive and battery configuration is shown in U.S. Pat. No. 5,964,473 ("Degonda"), which discloses a transversely oriented motor that splits the battery compartment.

Because the conventional location of the battery compartment is at least partly underneath the passenger chair, the chair must be removed to access the batteries.

Furthermore, there is a general need for wheelchair configurations that are simple and inexpensive, yet are effective in climbing obstacles such as curbs.

SUMMARY OF THE INVENTION

Wheelchair configurations and corresponding methods of use are provided that have a combination of stability and curb-climbing capabilities. According to a first aspect, a wheelchair includes a frame; a pair of drive wheels and at least one rear wheel; a pair of drives operatively coupled to the drive wheels such that each one of the drives includes a motor and a gearbox; a pair of forward-extending, front arms rigidly coupled to the drives such that each one of the drives-and-front arm structures is pivotally coupled to the frame only at a single pivot axis; and a pair of front wheels rotatably coupled the front arm. A centerline of the pivot axis has a vertical height that is approximately the same or less than the vertical height of an axis of rotation of the front wheel. Accordingly, the motor torque is capable of biasing the front wheels when encountering or ascending a curb, when accelerating, and when decelerating.

Preferably, the wheelchair drive includes a drive mount, which preferably is an upright mounting plate, to which the gearbox is rigidly coupled. The drive mount is coupled to the frame at the pivot axis. The motors preferably are transversely mounted and their batteries are located to the rear of the motors. An articulating beam is generally located generally behind the batteries. The pivot axis preferably is spaced apart from the front wheel axis by a horizontal dimension that is between about 40% and about 65% of the horizontal dimension between the drive wheel axis and the front castor axis, more preferably between about 45% and about 60%, more preferably, approximately 54% of the horizontal dimension between the drive wheel axis and the front castor axis.

A method of using this wheelchair configuration includes positioning the wheelchair such that the front wheels are in contact with or in close proximity to an obstacle that has a height measured from a support surface that is approximately equal to or less than the height of the front wheel axis of rotation; and urging the wheelchair forward to enable the front wheels to ascend the obstacle.

According to another aspect, a wheelchair includes a frame; a pair of opposing drives, each including a substantially-transversely mounted motor and gearbox; a pair of drive wheels each coupled to a corresponding one of the drives; and a chair assembly supported on the frame and being moveably coupled thereto such that the chair is forwardly moveable to enhance access to a power supply portion of the wheelchair without fully removing the chair from the frame. Preferably, the power supply portion constitutes batteries that are located rearward of the chair support and rearward of the motors. Preferably, the seat is hinged or slideable.

According to another aspect, a wheelchair includes a frame; a pair of opposing drive wheels; a pair of pivoting assemblies associated with the drive wheels and including a drive assembly and a front arm assembly. Each drive assembly (i) includes a motor and gearbox that are transversely mounted relative to the frame, (ii) is operatively coupled to one of the drive wheels, and (iii) is pivotally connected to the frame. Each front arm assembly includes a front wheel rotatably coupled to the front arm, and the front arm assembly is rigidly coupled to the drive assembly. Accordingly, the drive assembly and front arm assembly pivot in unison about the pivotal connection upon encountering an obstacle. Preferably, a pivot axis of the pivotal connection between the drive assembly and the frame has a vertical height that is approximately the same or less than the vertical height of an axis of rotation of the front wheel. The motor and single reduction gearbox assembly has a longitudinal axis that is transverse relative to the frame, and the drive assembly includes a mount to which the gearbox is affixed such that the mount includes a surface to which the front arm is rigidly affixed. The battery compartment may be located rearward of the drive and an articulating transverse beam, located rearward of the battery, may include a pair of rear idler wheels.

According to another aspect, a wheelchair includes a frame; a seat coupled to the frame; a pair of opposing drive wheels and at least one rear wheel. Each side of the wheelchair includes: a drive including a motor and a gearbox that are transversely mounted, such the drive is operatively coupled to a drive wheel; and a forward-extending, front arm rigidly coupled to the drive such that each one of the drive and front arm structures is pivotally coupled to the frame only at a single pivot axis. The wheelchair also includes a front wheel located at a forward end of the front arm; a pivoting transverse beam located rearward of the drive wheels and having a pair of rear idler wheels coupled to opposing ends thereof; and at least one battery assembly that is accessible from rearward of the drive wheels.

Preferably, the gearbox is a single reduction gearbox and the front wheel is rotatably coupled the front arm, and a centerline of the pivot axis has a height that is approximately the same or less than the vertical height of an axis of rotation of the front wheel. The pivot on which the transverse beam pivots is substantially horizontal and located rearward of the battery assembly such that the battery assembly is accessible via the back-center of the wheelchair.

According to another aspect, a wheelchair includes a frame; a seat coupled to the frame; a pair of opposing drive wheels and at least one rear wheel. Each side of the wheelchair includes a drive including a motor and a gearbox that are transversely mounted, wherein the drive is operatively coupled to a drive wheel; a forward-extending, front arm operatively coupled to the drive whereby motor torque may bias the front arm, wherein the front arm coupled to the frame at a pivot axis; and a front wheel rotatably coupled the front arm such that a centerline of the pivot axis (i) has a height that is approximately the same or less than the vertical height of an axis of rotation of the front wheel and (ii) is horizontally spaced apart from the axis of rotation of the front wheel by no more than about 65% of the horizontal distance between the axis of rotation of the front wheel and the drive wheel axis.

The centerline of the pivot axis is horizontally spaced apart from the axis of rotation of the front wheel more preferably by no more than about 50% of the horizontal distance between the axis of rotation of the front wheel and the drive wheel axis, more preferably no more than about 40%, and even more preferably no more than about 33% of the horizontal distance between the axis of rotation of the front wheel and the drive wheel axis. Preferably, the wheelchair includes a pivoting transverse beam that is located rearward of the drive wheels, and rearward of the batteries, and that has a pair of rear idler wheels coupled to opposing ends thereof.

According to another aspect, a wheelchair includes a frame; a seat coupled to the frame; a pair of opposing drive wheels; and at least one rear wheel. Each side of the wheelchair includes: a drive including a motor and a gearbox that are transversely mounted such that the drive is operatively coupled to a drive wheel; a forward-extending, front arm operatively coupled to the drive whereby motor torque may bias the front arm and such that the front arm is coupled to the frame at a pivot axis; and a front wheel rotatably coupled the front arm. The pivot axis (i) has a height that is approximately inline with or below a line extending between a drive wheel centerline and a centerline of rotation of the front wheel and (ii) is horizontally spaced apart from the axis of rotation of the front wheel by no more than about 65% of the horizontal distance between the axis of rotation of the front wheel and the drive wheel axis.

The centerline of the pivot axis is horizontally spaced apart from the axis of rotation of the front wheel more preferably by no more than about 50% of the horizontal distance between the axis of rotation of the front wheel and the drive wheel axis, more preferably no more than about 40%, and even more preferably no more than about 33% of the horizontal distance between the axis of rotation of the front wheel and the drive wheel axis. Preferably, the pivot axis height is approximately the same as or less than the vertical height of an axis of rotation of the front wheel, batteries for powering the motors are disposed rearward of the motors, and an articulating, transverse beam to which rear wheels are operatively attached is located the batteries.

Where applicable above, the front wheel may be a caster that is in contact with the ground while the wheelchair is at rest on a level ground plane or an anti-tip wheel that is suspended from the ground plane. In either case, springs may bias the wheels.

BRIEF DESCRIPTION OF THE DRAWINGS

FIG. 6A is a side view of the wheelchair shown in FIG. 1 on a level ground surface with the cover, drive wheel, and a portion of the mounting plate removed;

FIG. 6C is a side view of the wheelchair shown in FIG. 6A illustrating the wheelchair descending a curb;

FIG. 7A is a perspective view of another embodiment of a wheelchair with a portion of the chair assembly and cover removed;

FIG. 9 is a top view of the wheelchair shown in FIG. 7A;

DETAILED DESCRIPTION OF ILLUSTRATIVE EMBODIMENTS

Figure 1:
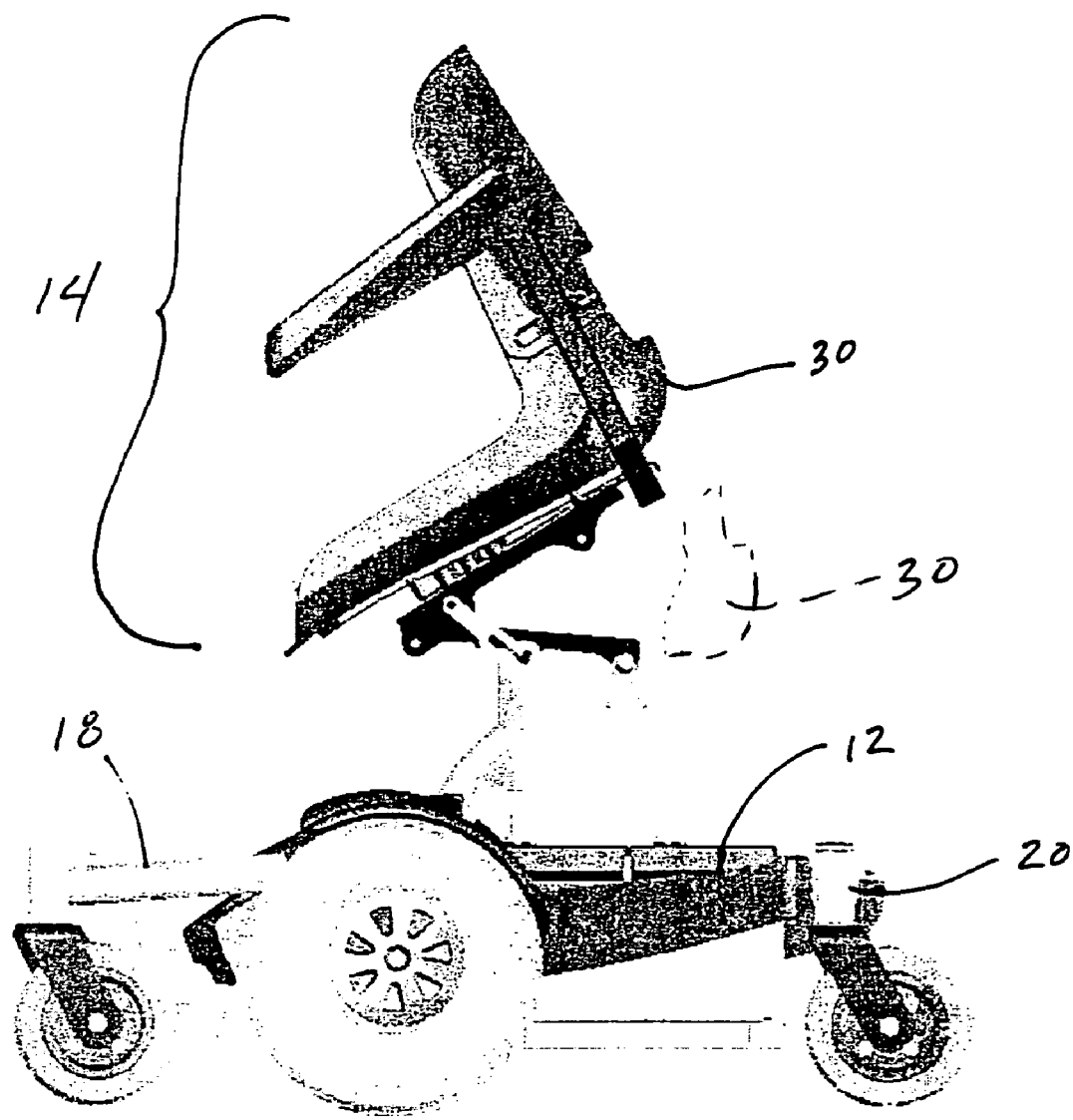
FIG. 1 is a side view of an embodiment of a wheelchair illustrating aspects of the present invention.
Figure 2:
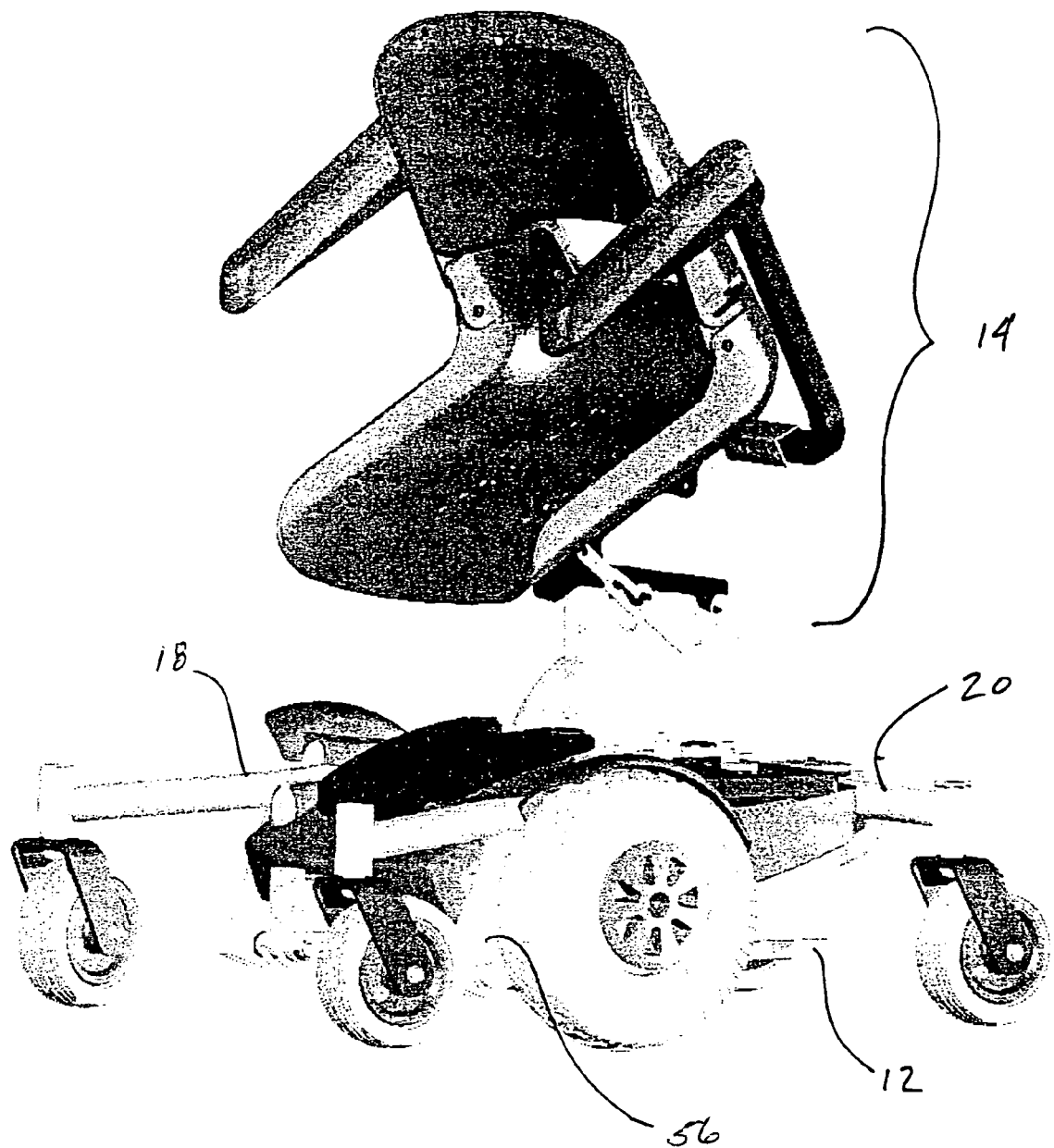
FIG. 2 is a perspective view of the wheelchair shown in FIG. 1.

Two main embodiments of a wheelchair are disclosed herein to illustrate aspects of the present invention. A first embodiment wheelchair 10 is shown in FIG. 1 through FIG. 5. A second embodiment wheelchair 10' is shown in FIGS. 7A, 7B, 8A, and 8B. First embodiment wheelchair 10 includes a frame assembly 12, a chair assembly 14, a drive assembly 16, a front pivot assembly 18, and a rear wheel assembly 20.

Frame assembly 12 in the embodiment shown is a box-like structure that is formed of welded and/or bolted square and round tubing and formed plates. The frame structure, which is generally referred to herein by reference numeral 24, includes a central support 25a, a rear support 25b, a T-shaped support 25c, a pair of pivot supports 25d, and a footrest support 25e. Frame 24 is generally rigid, even though the present invention encompasses frames having joints for enhancing the suspension or any other reason.

Figure 3A:
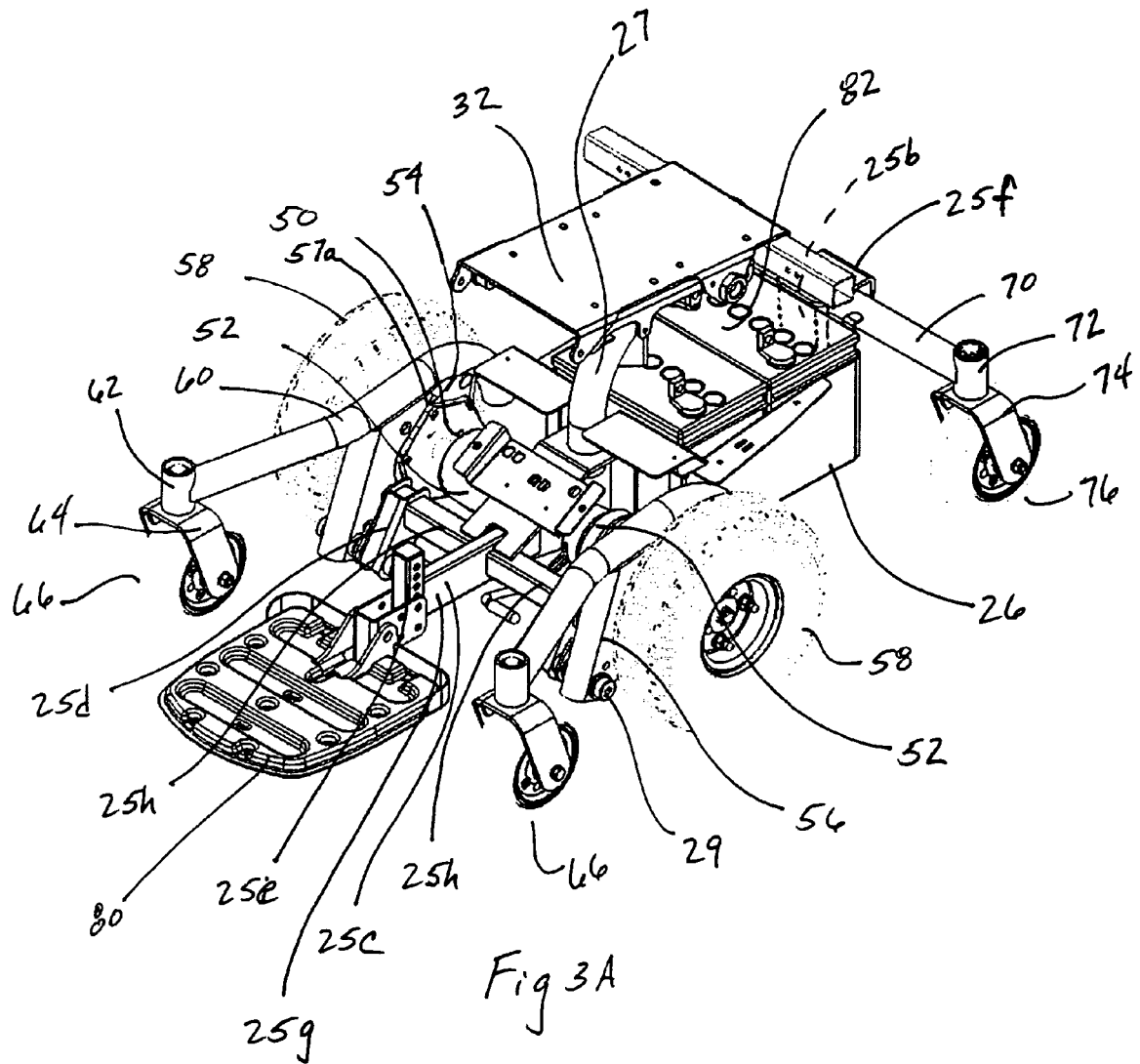
FIG. 3A is a perspective view of the wheelchair shown in FIG. 1 with portions of the chair assembly and cover removed.
Figure 3B:
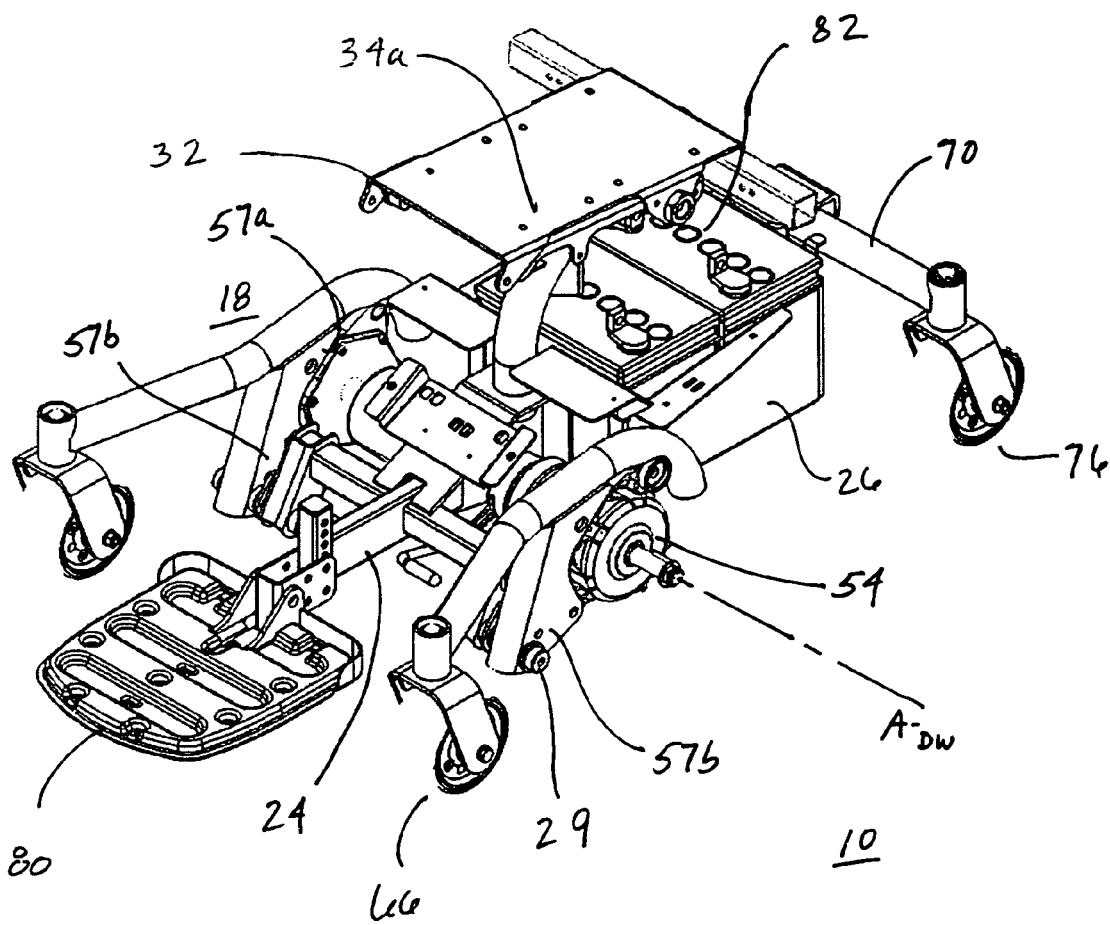
FIG. 3B is a perspective view of the wheelchair as shown in FIG. 3A with the drive wheels and a portion of the mounting plate removed.
Figure 4A:
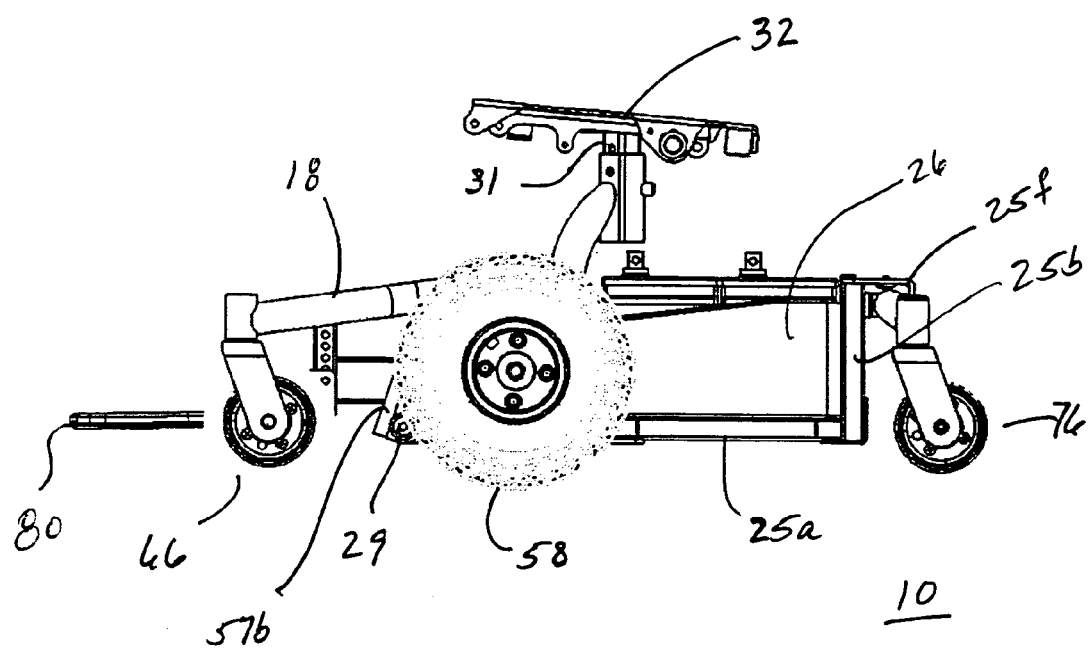
FIG. 4A is a side view of the wheelchair shown in FIG. 1 with portions of the chair assembly and cover removed.
Figure 4B:
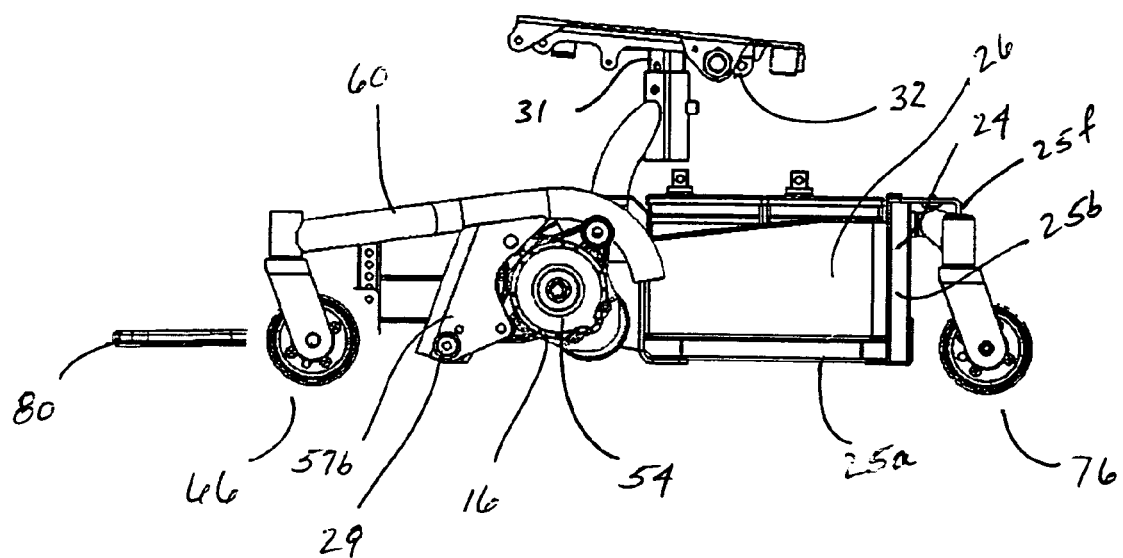
FIG. 4B is side view of the wheelchair as shown in FIG. 4A with the drive wheel and a portion of the mounting plate removed.
Figure 5:
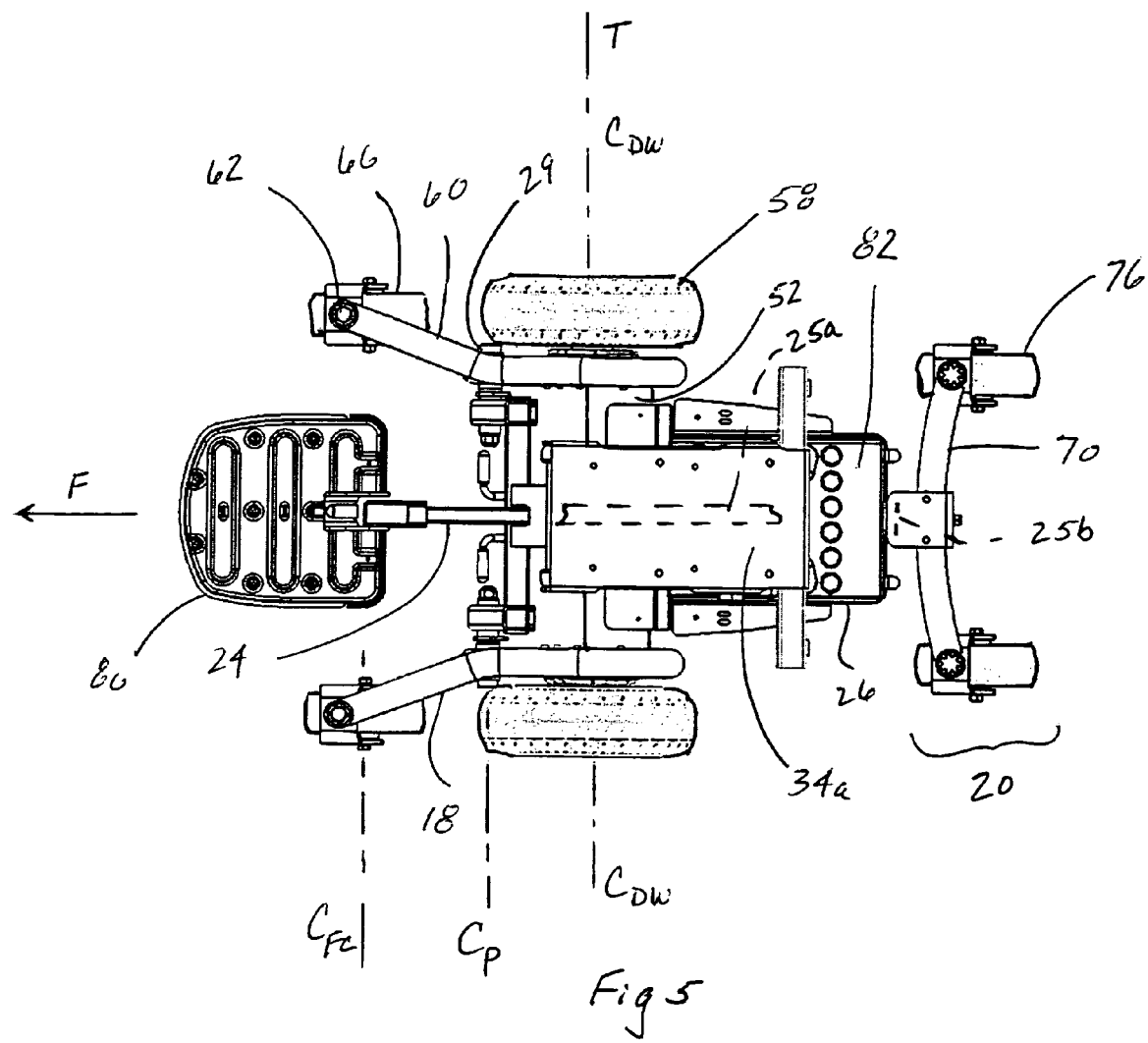
FIG. 5 is a top view of the wheelchair shown in FIG. 1 with portions of the chair assembly and cover removed.

Central support 25a, which is best shown in FIGS. 3A, 3B, and 4B, is disposed along a horizontal centerline of the wheelchair 10. Central support is shown in FIGS. 4A and 4B, and partially shown schematically in dashed lines in FIG. 5. Rear support 25b, which is shown in FIGS. 4A and 4B, and schematically in dashed lines in FIGS. 3A and 5, extends upwardly from a rear portion of central support 25a and includes a mounting plate 25f. T-shaped support 25c is disposed above and forward of central support 25a and includes a longitudinal portion 25g and a pair of transverse supports 25h. Pivot supports 25d extend generally downwardly from transverse supports 25h. Footrest support 25e is disposed at a forward end of longitudinal portion 25b of T-shaped support 25c. A footrest 80 is coupled to footrest support 25e.

A housing 26 for holding batteries 82 or other power source is bolted or welded to frame 24. A chair support, such as support post 27, extends upwardly from frame 24. Support post 27 may be integrally formed as a portion of frame 24 or may be a separate structure. Support post 27, as best shown in FIG. 6A, includes a substantially upright portion 28a, a backwardly curved portion 28b, and an upright square tube 28c.

Figure 11:
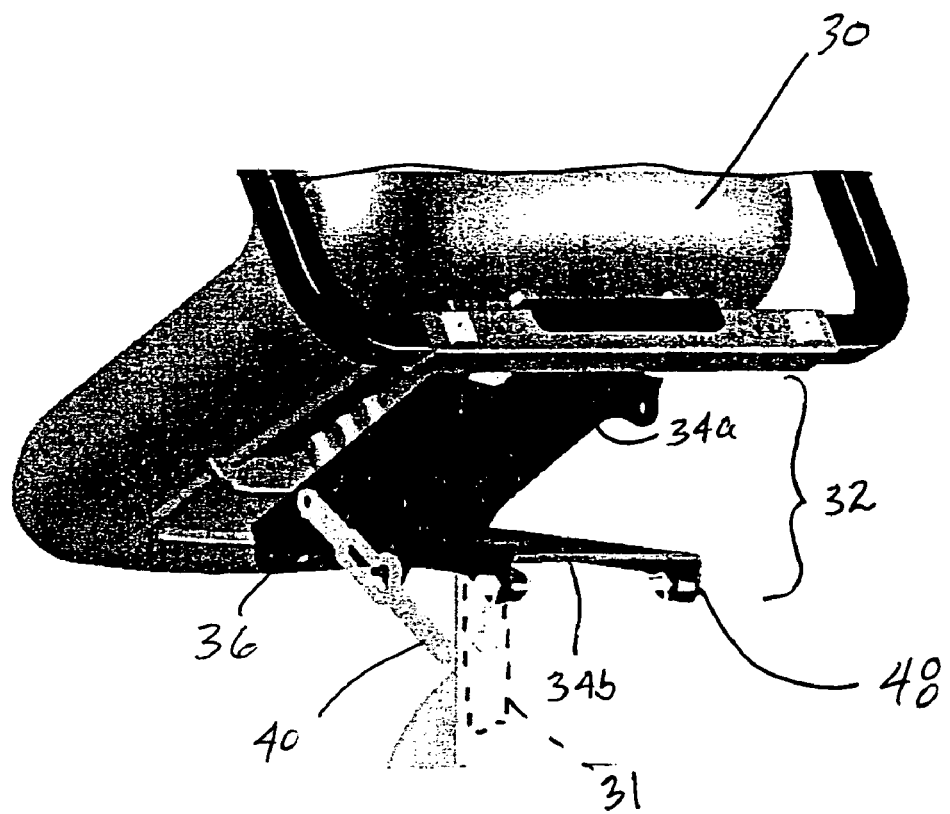
FIG. 11 is a perspective view of a portion of the chair assembly showing the chair in its forward-most position.
Figure 12:
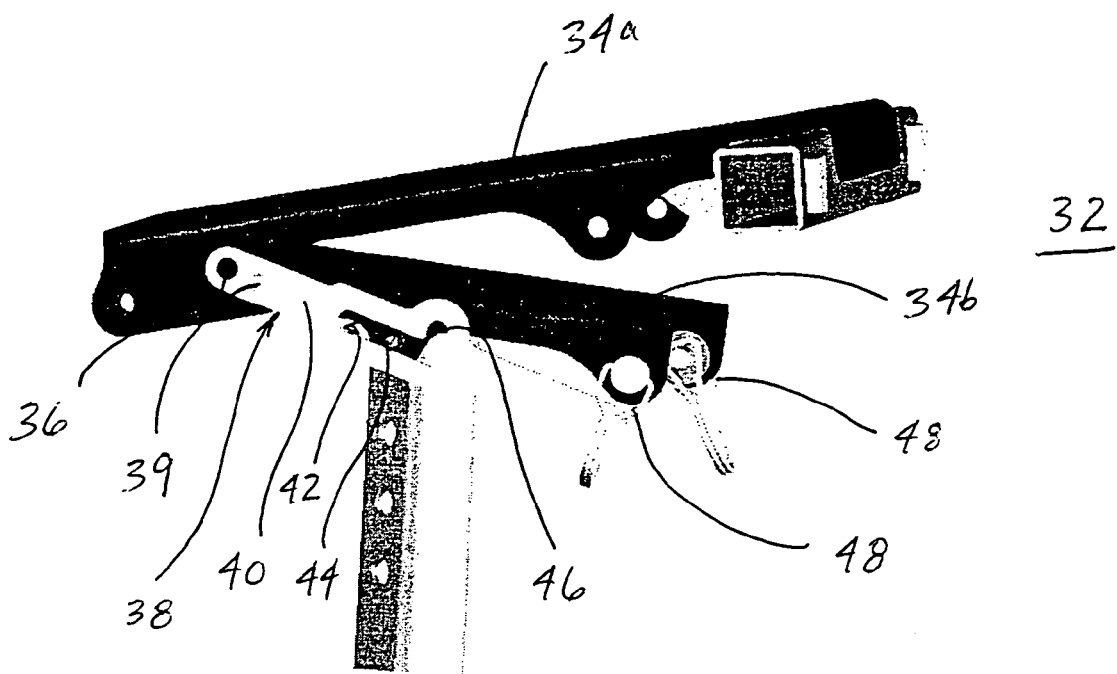
FIG. 12 is a perspective view of a moveable portion of the chair assembly corresponding to the chair being in an intermediate position.
Figure 13:
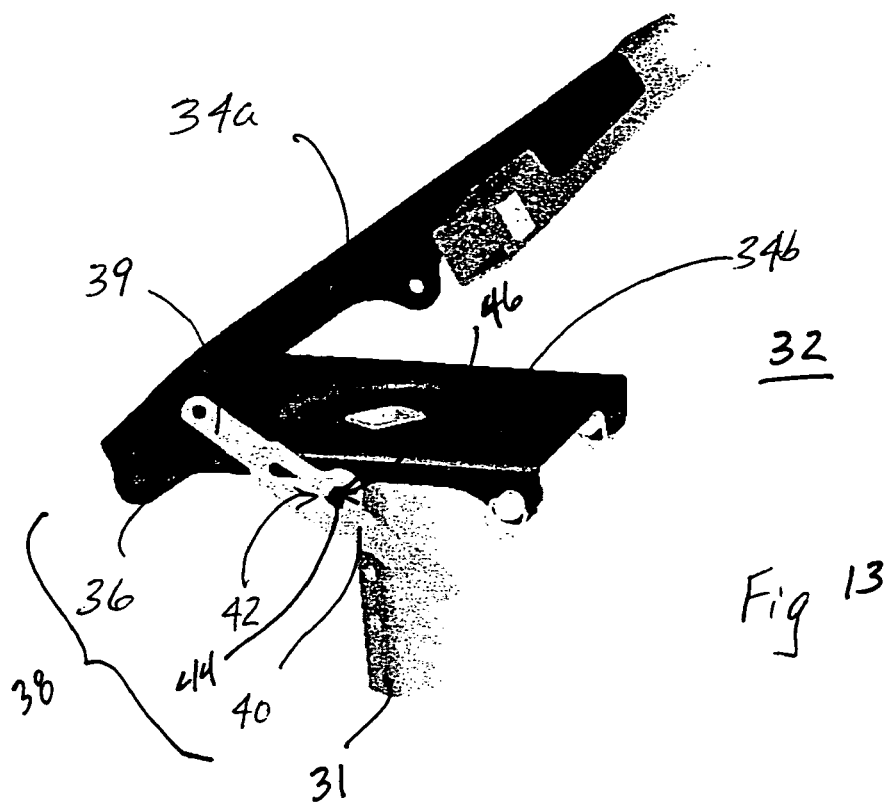
FIG. 13 is a perspective view of the moveable portion of the chair assembly corresponding to the chair being in its forward-most position.

Chair assembly 14 includes a seat 30 for holding the wheelchair passenger, a seat post 31 for insertion into tube 28c of support post 27, and a hinge assembly 32 for enabling the seat 30 to pivot forward. Hinge assembly 32 enables seat 30 to pivot relative to seat post 31. As best shown in FIG. 11 through FIG. 13, hinge assembly 32 includes a pair of plates or brackets 34a and 34b, and a hinge or pivot 36.

To retain the seat in its forward-most position, which is shown in FIG. 11 and FIG. 13, a retainer assembly 38 includes a retainer plate 40 having a slot 42, a stud 44, and a detent recess 46. Retainer plate 40 preferably is attached to upper bracket 34a by a pivot 39. Stud 44 preferably is affixed to lower bracket 34b and disposed to slide within slot 42. Detent recess 46 is formed in retainer plate 40 as an extension of slot 42. Stud 44 can slide into the recess 46 to temporarily and releasably lock seat 30 in its forward-most position. This locking mechanism can be released by moving the retainer plate 40 by hand such that stud 44 is disposed into the long slotted portion of slot 42, which enables stud 44 to slide in slot 42 to enable seat 30 to return to its ready position for use by a passenger The ready position is shown schematically in dashed lines in FIG. 1. A pair of pins 48 are provided for manually locking brackets 34a and 34b together to prevent seat 30 from pivoting forward and keep seat 30 in its ready position.

Figure 15:
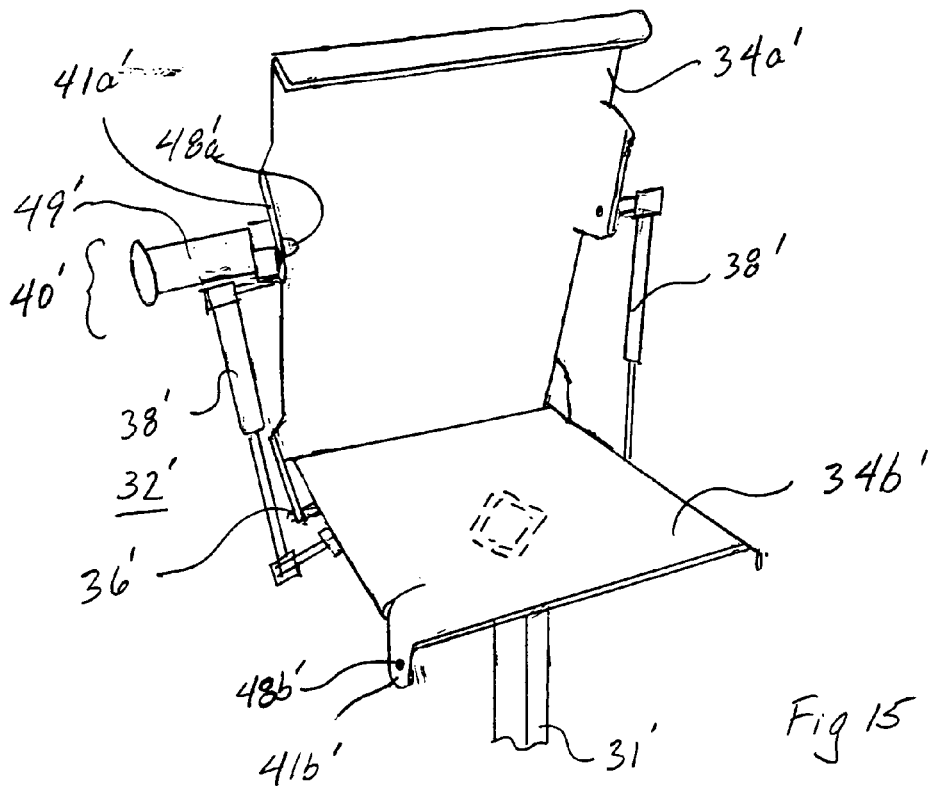
FIG. 15 is a perspective view of the embodiment shown in FIG. 14 showing the chair in a forward-most position.
Figure 14:
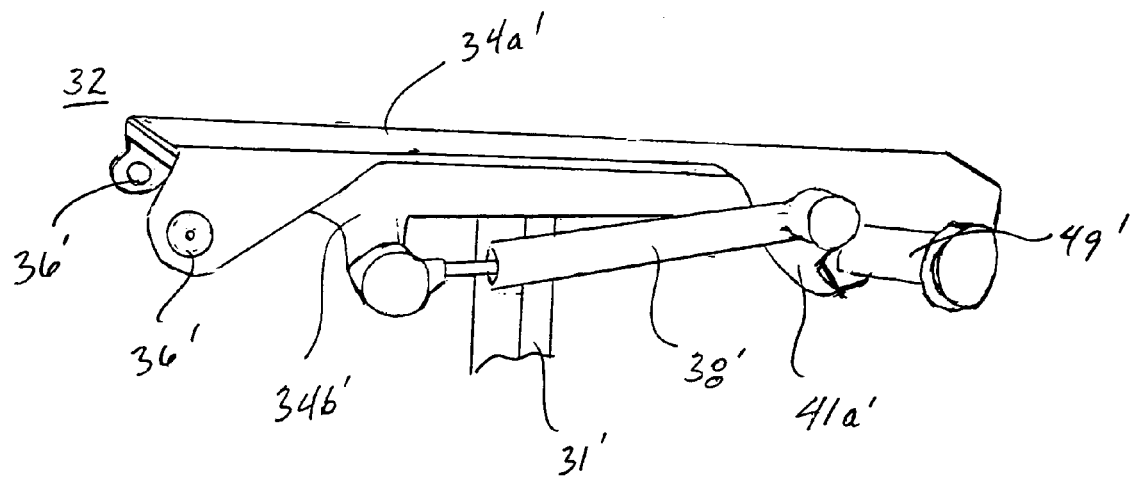
FIG. 14 is a perspective view of another embodiment of a moveable portion of the chair assembly shown in a lower or operational position.

Referring to FIGS. 14 and 15 to illustrate another assembly to enable a seat 30 (not shown in FIGS. 14 and 15 for convenience of illustration) to move forward, a hinge assembly 32' is coupled to a seat post 31'. Hinge assembly 32' includes an upper mounting plate or bracket 34a' and a lower mounting plate or bracket 34b'. Plates 34a' and 34b' are connected at front portions thereof by a hinge or pivot 36'. A pair of gas or spring-loaded cylinders 38', which are biased toward the extended position, are connected between the two plates to urge upper bracket 34b' toward its forward-most position, as shown in FIG. 15. Preferably, cylinders 38' provide enough force to retain seat 30 in its forward position such that a person can by hand lower seat 30 against the force of cylinders 38'. Also, cylinders 38' are oriented and chosen such that force tending move chair 30 from its lowermost position does not create a personnel risk. In general, cylinders 38' preferably assist in the raising of chair 30.

A latch mechanism 40' holds lower bracket 34b' in its rearward-most or lower-most position, in which upper bracket 34a' rests on lower bracket 34b', and is coupled to an ear or flange 41a' on upper plate 34a'. The lower-most position is shown in FIG. 14. Latch mechanism 40' includes a retractable pin 48a', which preferably may be spring loaded or, alternatively, retractable by threading onto threads fixed onto one of the brackets. As best shown in FIG. 15, pin 48a' is housed in a body 49', which is affixed to an ear or flange 41a' that extends from upper bracket 34a'. Body 49' preferably is threaded onto a nut that is affixed to flange 41a'.

Lower bracket 34b' includes connections for cylinders 38', a connection for seat post 31', and a downwardly projecting ear or flange 41b'. Flange 41b' preferably has a curved portion that forms a smooth transition between a substantially vertical portion of flange 41b' and the major surface of bracket 34b'. Thus, when upper bracket 34a' is lowered onto lower bracket 34b', pin 48a' contacts the curved portion of flange 41a' and gradually retracts. Pin 48a' aligns with a hole 48b' formed in flange 41a' when upper bracket 34a' is fully engaged with lower bracket 34b'. Pin 48a' then extends into hole 48b' to retain upper bracket 34b' onto lower bracket 34a'.

Figure 16:
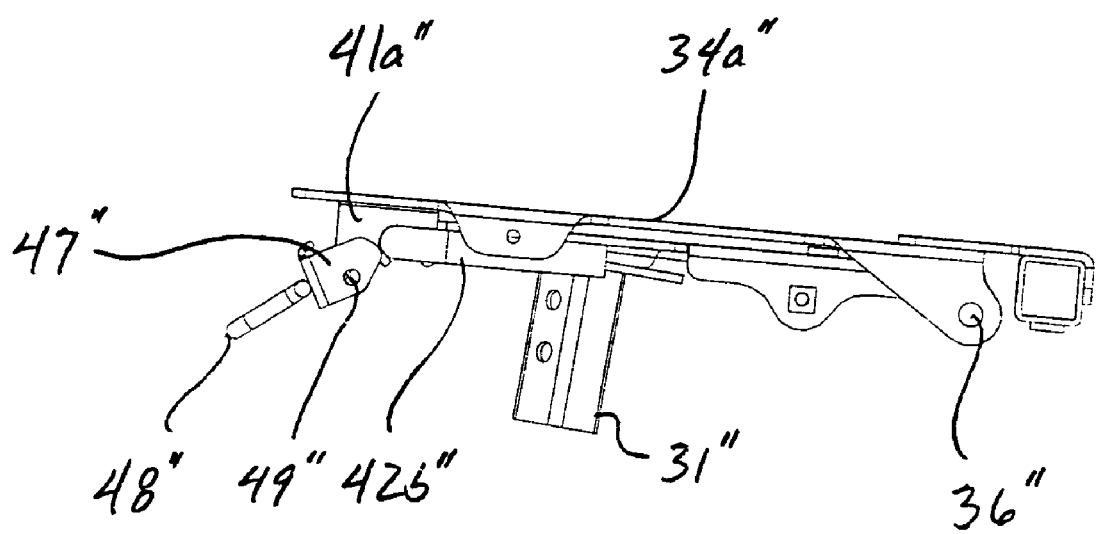
FIG. 16 is a side view of another embodiment of a moveable portion of the chair assembly shown in its lower or operational position.
Figure 17:
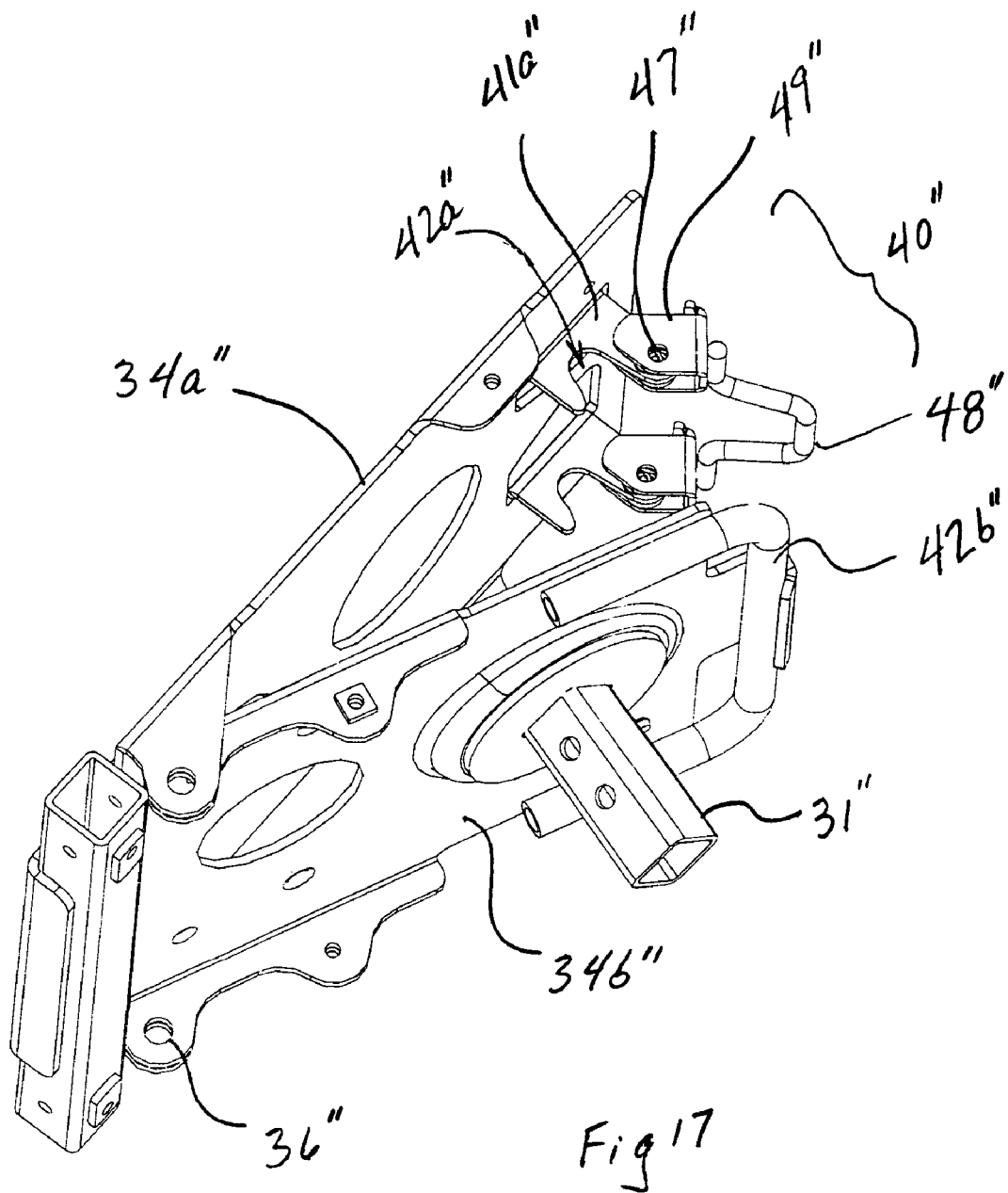
FIG. 17 is a perspective view of the underside of the embodiment shown in FIG. 16, but shown in its open configuration that corresponds to the chairs' forward-most position.

FIGS. 16 and 17 show an alternative embodiment of the assembly that enables seat 30 (not shown in FIGS. 17 and 17 for clarity) to move foreword. The brackets 34a" and 34b" of the embodiment of FIGS. 16 and 17 are similar to those shown in FIGS. 14 and 15 except latch mechanism 40' (and its cooperating structure) is omitted in favor of a locking handle 40" (and its cooperating structure) that is employed to retain upper bracket 34a" and lower bracket 34b" together. In this regard, upper bracket 34a" includes a pair of tabs 41a" that form a slot 42a". In its lower position, slot 42a" receives an alignment bar 42b" that is part of lower bracket 34b". Brackets 34a" and 34b" are coupled together by a hinge or pivot 36".

Locking handle 40" includes a handle portion 48" and a pair of cam portions 49" that are connected to tabs 41a" via a hinge 47". In the lower position, shown in FIG. 16, can portions 49" engage alignment bar 42b" to retain brackets 34a" and 34b" together. Upward rotation of handle mechanism 40" disengages cam portions 49" from alignment bar 42b" and enables upper bracket 34a" to move upward relative to lower bracket 34b". Preferably, air cylinders, as shown in FIGS. 14 and 15 (not shown in FIGS. 16 and 17), are connected between brackets 34a" and 34b" to urge seat 30 toward its forward-most position (or more preferably to aid in the manual raising of seat 30 toward its forward-most position), and to retain it in the forward-most position, until manually returned to its lower position.

Figure 18:
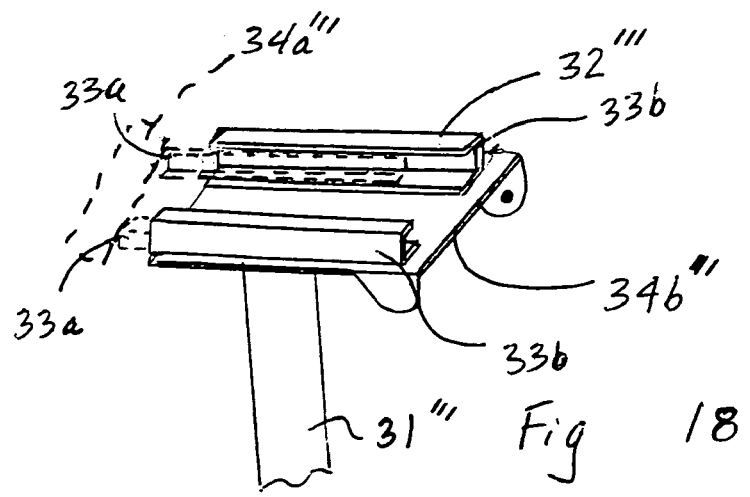
FIG. 18 is a perspective view of another embodiment of a moveable portion of the chair assembly.

Referring to FIG. 18 to illustrate another embodiment of an assembly to enable a seat 30 to move forward, a slide assembly 32''' is mounted onto a lower chair assembly bracket 34b'''. A corresponding upper chair assembly bracket 34a''', which is shown schematically in dashed lines, is rigidly coupled to a chair 30 (not shown in FIG. 18). A pair of slides enables upper bracket 34a''' to slide on lower bracket 34b''', which is affixed to a support 31. Support post 27''' is generally identical to post 27 described above.

Each one of the pair of slides includes a slide member 33a that is fixed to the upper bracket 34a''' and a cooperating slide member 33b that is fixed to the lower bracket 34b'''. Slide members 33a and 33b may have any configuration that will enable seat 30 to slide relative to lower bracket 34b''', including conventional slides.

According to a first embodiment wheelchair 10 as illustrated beginning at FIG. 3A, a wheelchair 10 includes a pair of drive assemblies 16 and pivot assemblies 18. Preferably, the left combination of drive assembly 16 and pivot assembly 18 is the mirror image of the right combination of drive assembly 16 and pivot assembly 18. For convenience, only one of each assembly drive 16 and pivot assembly 18 is described in detail herein, as it is clear that the description applies equally to each one of the left and right assemblies 16 and 18.

Drive assembly 16 includes a pair of drives 50, each of which includes a motor 52, a gearbox 54, and a mounting plate 56. Each one of the drive assemblies is connected to one of a pair of drive wheels 58. Drive assembly 16 is pivotally coupled to frame assembly 12 by the pivot 29 between frame structure 24 and mounting plate 56. Motor 52 preferably is oriented with its centerline (that is, the central axis of its output shaft) parallel to the output shaft of gearbox 54, which is coupled to a drive wheel 58 as shown in the figures. A longitudinal centerline of the output shaft of gearbox 54, which preferably is a single reduction gearbox, is collinear with the drive wheel rotational axis, which is designated C-DW. Motor 52 may be oriented such that its centerline is collinear with or—as shown in the figures—is parallel to, but offset from, drive wheel rotational axis C-DW and the output shaft of gearbox 54.

Drives 50 preferably are mounted transverse to the direction of translation of the wheelchair. As illustrated by arrow F shown for example in FIG. 6A, the direction of translation is parallel to a ground plane surface 200 on which the wheelchair moves forward and perpendicular to the rotational axis C-DW of the drive wheels. The transverse axis is parallel to the axis of rotation of the drive wheels and parallel to the level ground. As used herein, the orientation of rotational or pivotal axes are based on the wheelchair at rest on level ground surface 200 with all wheels oriented to roll straight forward (direction F). Also, the present invention encompasses motors 52 having a centerline (that is, the central axis of its output shaft) that is not parallel to the drive wheel rotational axis C-DW. The present invention (that is, as recited in a claim) is not limited to any relationship or orientation of any part of the drive relative to the frame unless such relationship or orientation is explicitly stated in the claim.

Drive 50 is rigidly affixed to mounting plate 56. Mounting plate 56 preferably is planar and oriented perpendicular to rotational axis C-DW of drive wheels 58. As best shown in FIGS. 3A, 3B, 4A, and 4B, mounting plate 56 includes a mounting portion 57a to which drive 50 is coupled and a projection 57b that extends forward and downward. Preferably, gearbox 54 is bolted onto mounting portion 57a. Projection 57b houses a portion of a pivot 29 for pivotally connecting mounting plate 56 to pivot support 25d of frame 24.

Figure 19:
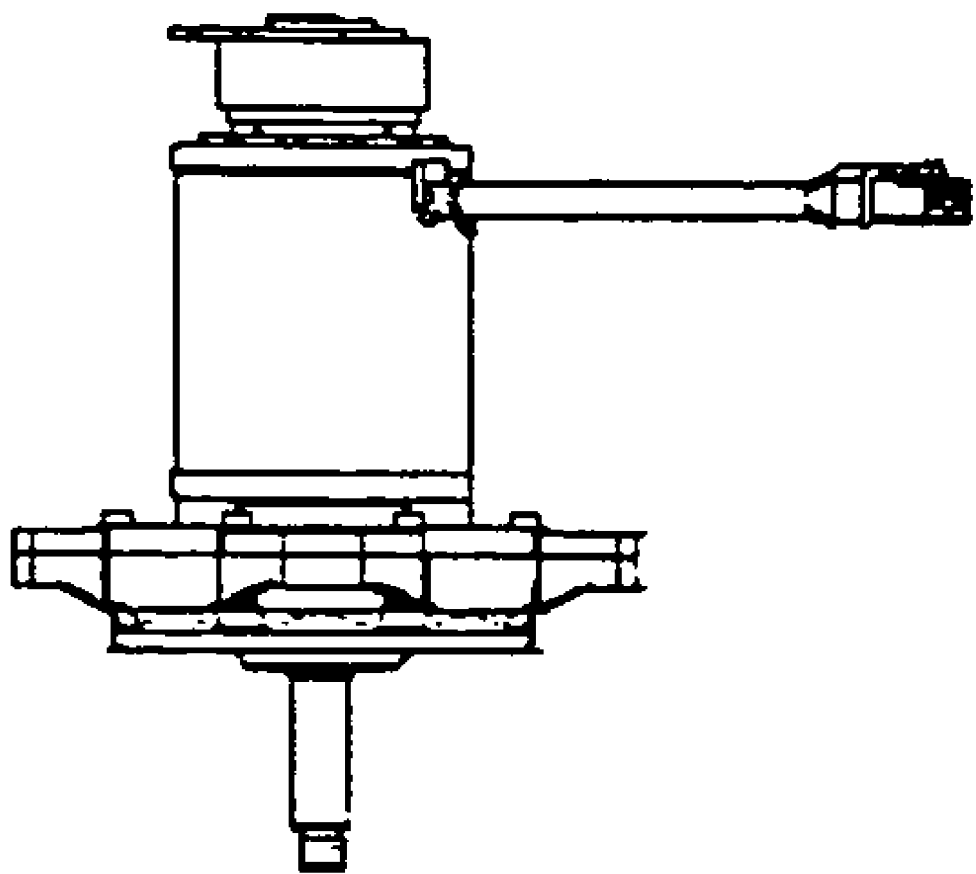
FIG. 19 is a view of the preferred drive.
Figure 20:
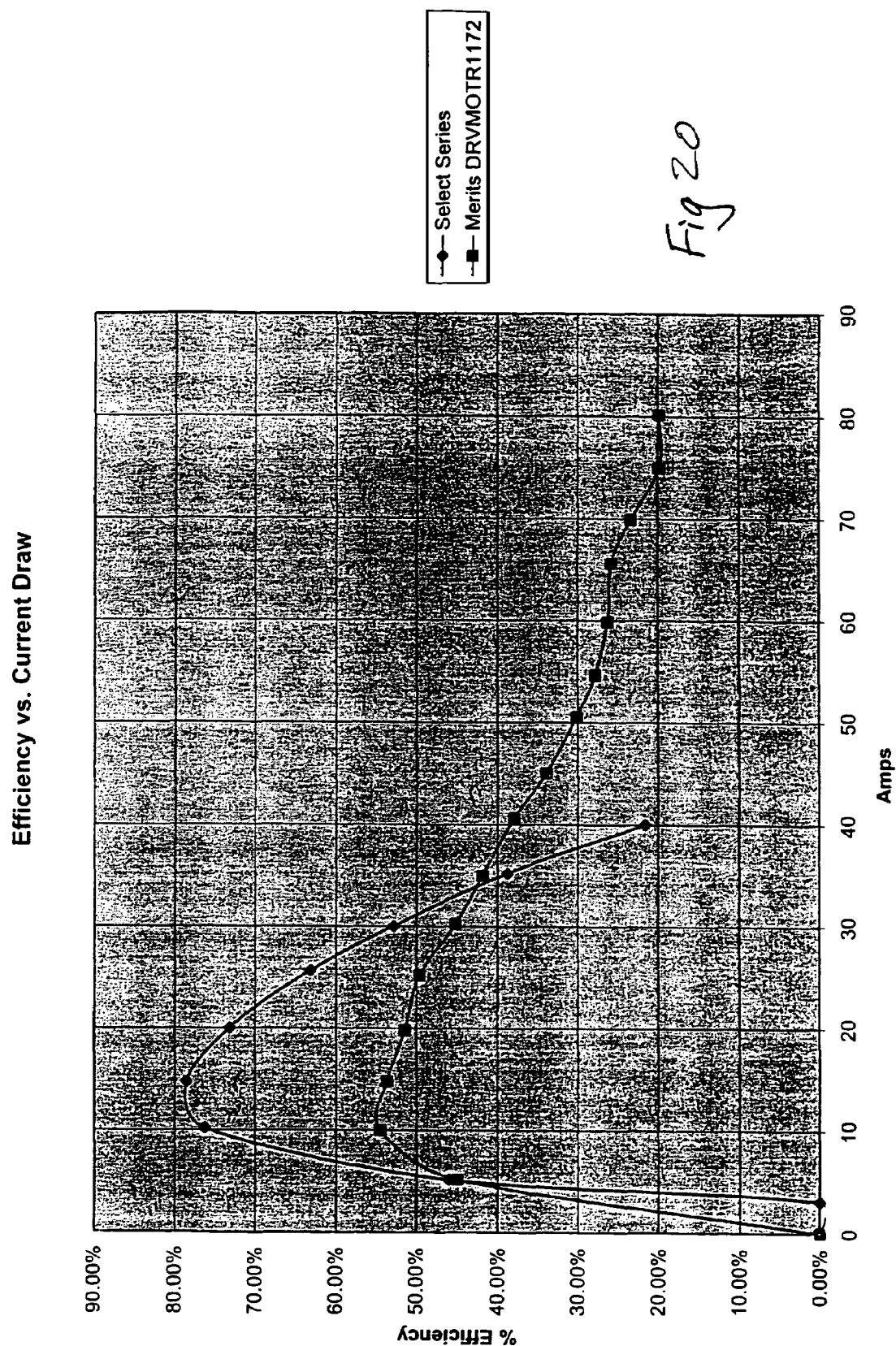
FIG. 20 is a graph of output efficiency versus current draw for a preferred drive and a conventional drive.
Figure 21:
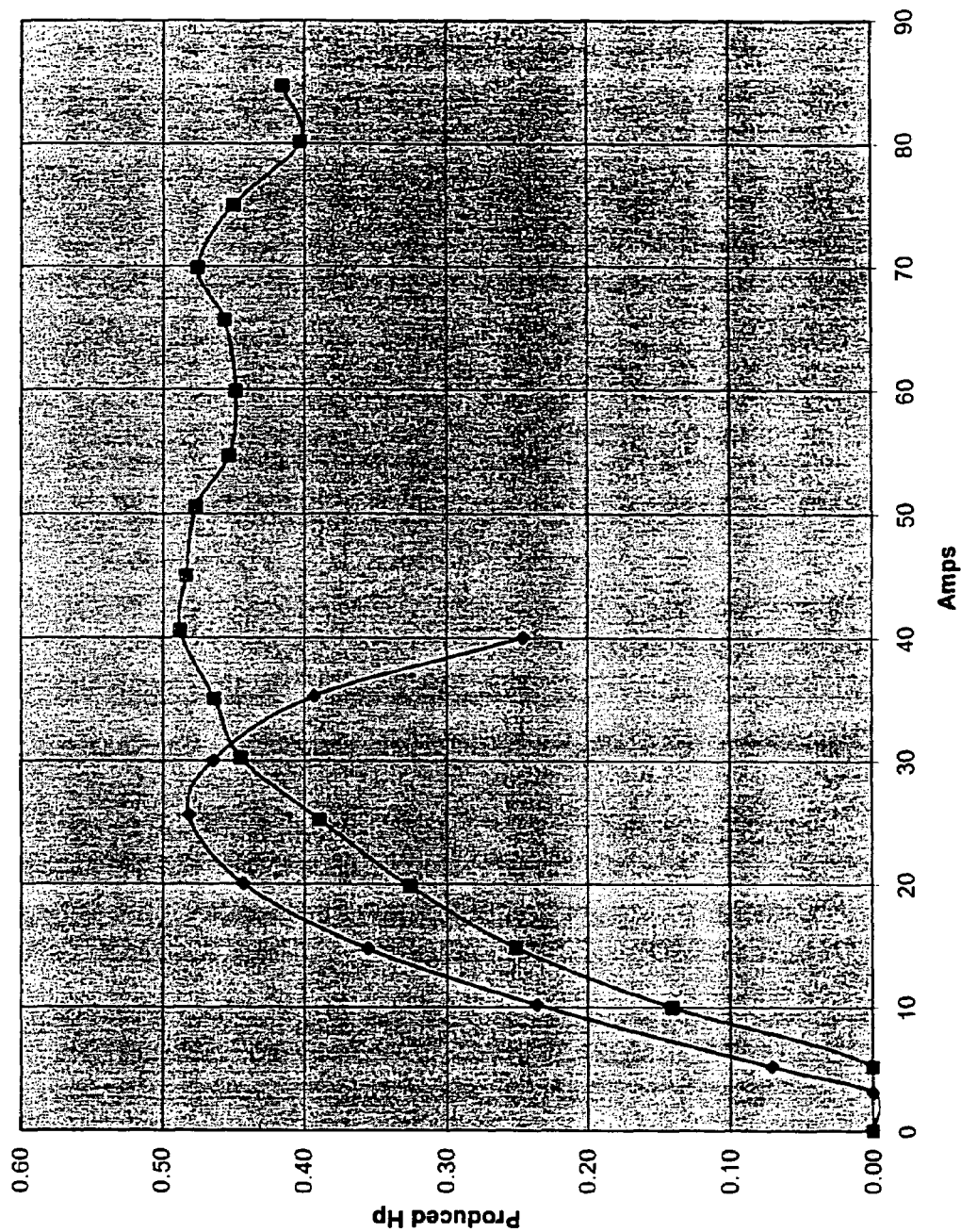
FIG. 21 is graph of output horsepower versus current draw for a preferred drive and a conventional drive.
Figure 22:
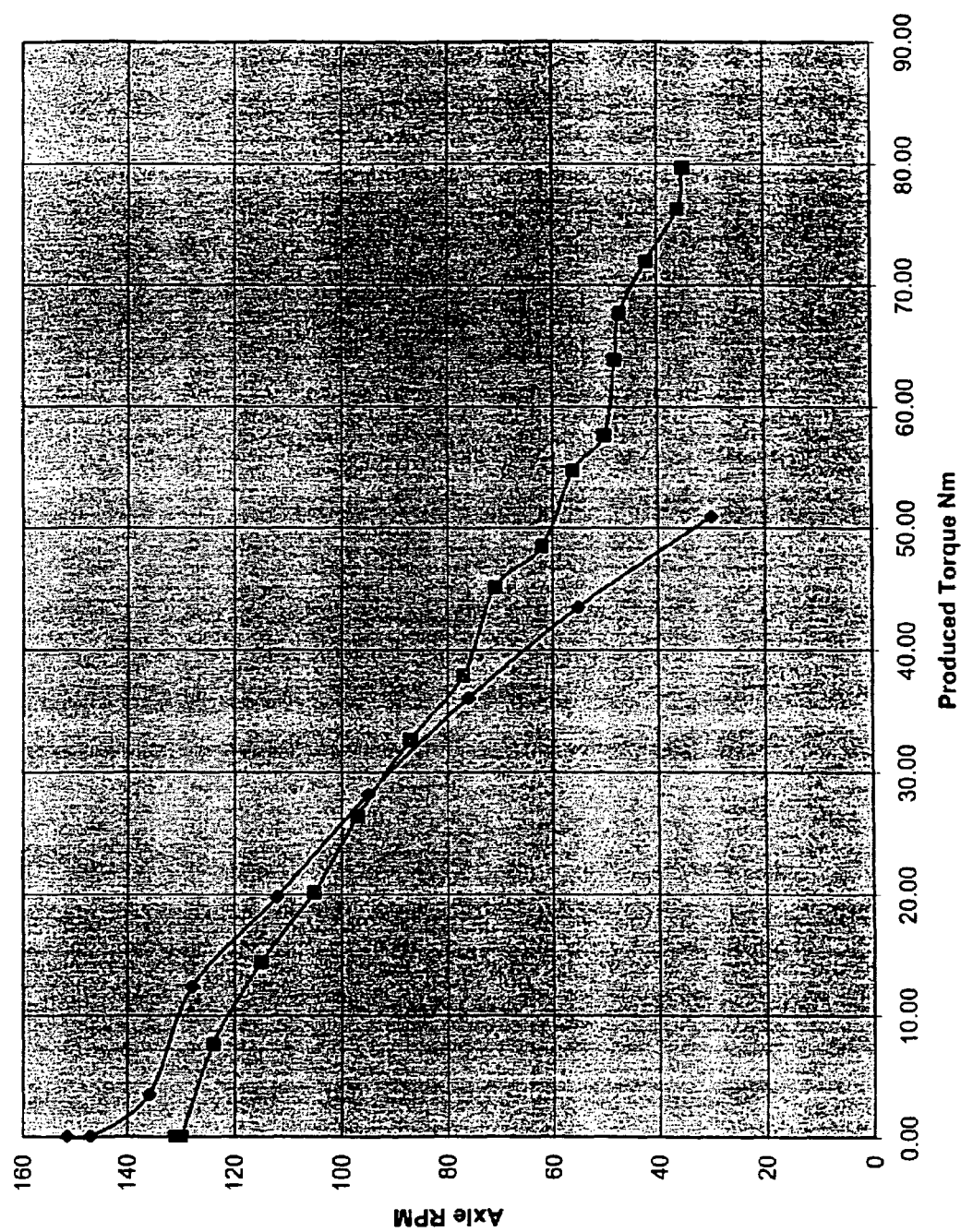
FIG. 22 is a graph of output speed versus torque for a preferred drive and a conventional drive.
Figure 23:
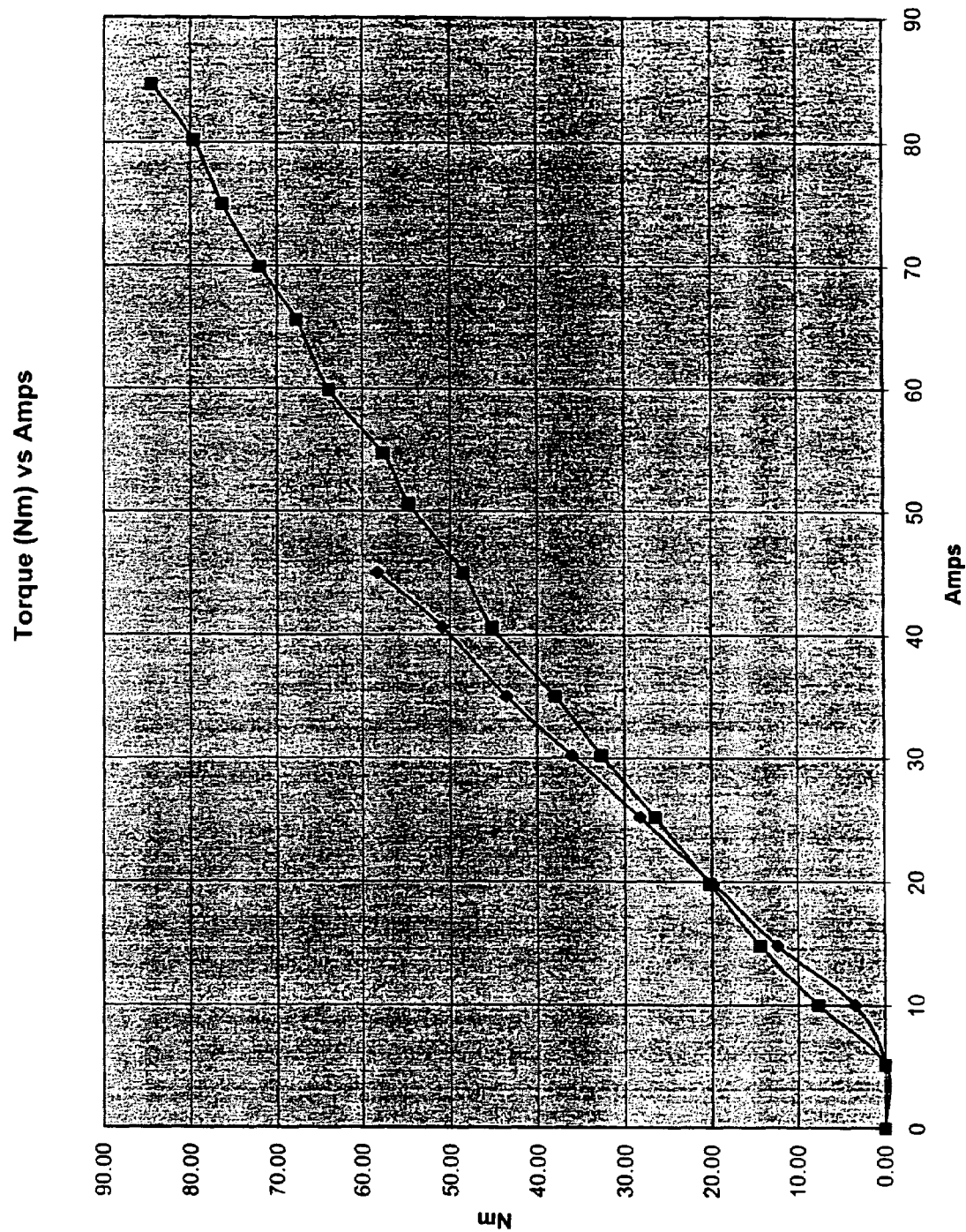
FIG. 23 is a graph of output torque versus current draw for a preferred drive and a conventional drive.

The configuration of drive 50 aids in locating and configuring battery compartment 26, but is not required generally to obtain other benefits of the inventive aspects of wheelchair 10. And the term "battery compartment" encompasses not only enclosures for housing the batteries but also volumes (even if unenclosed) in which the batteries for powering the motors resides. The configuration of drives 50 also provides improvement in efficiency compared with conventional right angle drives. Preferably drive 50, which is shown in FIG. 19, includes a 24 volt DC motor rated for 3.0 amps and a single reduction gearbox having a reduction ratio of 17.75:1. The no-load speed rating is 166 rpm. FIGS. 20 through 23 illustrate some benefits of preferred drive 50 compared with a conventional worm-gear, right angle drive having a 4500 rpm motor rated for 2.1 amps (at no load) and a 32:1 gear ratio. FIG. 20 is a graph of output efficiency versus current draw; FIG. 21 is graph of output horsepower versus current draw; FIG. 22 is a graph of output speed versus torque; and FIG. 23 is a graph of output torque versus current draw. Because of the higher efficiency of the preferred drive 50, a smaller motor may be used, and therefore a smaller controller and batteries may be used in some circumstances.

Pivot assembly 18 includes a front arm, such as caster arm 60, a swivel bearing 62, a caster support 64, and a caster wheel 66. Caster arm 60 is rigidly coupled to drive 50 via motor mounting plate 56. Preferably, a rearward end of caster arm 60 is affixed to an upper portion of mounting plate 56. Bearing 62 preferably has a barrel that is oriented vertically to enable caster wheel 66 to swivel or turn about a vertical axis to enhance the capability of wheelchair 10 to turn. Caster support 64 includes a fork on which an axle or bearing of caster wheel 66 is fixed.

Rear wheel assembly 20 includes an articulating beam 70 that is coupled to frame 24 at mounting plate 25f, a pair of swivel bearings 72, a pair of rear caster supports 74, and a pair of rear casters 76. Beam 70 is coupled to mounting plate 25*f* by any means that enables beam 70 to articulate to adapt to changes in the ground, such as a pivot having a horizontal pivot axis. Preferably, this pivot is located rearward of the battery compartment 26. The articulating structure and function of rear caster beams is shown in U.S. Pat. No. 6,129,165, which is incorporated herein by reference in its entirety. Bearings 72 are disposed on distal ends of beam 70, and each preferably includes a barrel that is vertically oriented to enable the corresponding caster 76 to swivel or turn to enhance the capability of wheelchair 10 to turn. Caster support 74 includes a fork on which an axle or bearing of caster wheel 76 is fixed.

Transverse mounting of drives 50 enhances the ability to accomplish and configure the combination of generally rearward battery location and an articulating, transverse beam 70. For example, for conventional configurations having a motor that is perpendicular to the drive wheel axis (and requiring a right angle gearbox, which is not shown in the figures), the motor swings about the gearbox output shaft to impart motion to the front caster arm, as for example shown in U.S. Pat. No. 6,129,165. Providing clearance for the swinging motion for such longitudinally mounted motors sacrifices space that may be used for locating the batteries. And because the articulating transverse beam also requires space for swinging (when, for example, only one rear caster is on a curb), configuring the combination of rear battery location and rear articulating, transverse beam would be difficult if conventional, longitudinally mounted motors with right angle gearboxes would be employed.

Support post 27, and preferably the connection between support post 27 and frame 24, is disposed rearward of drive motors 52, preferably generally rearward of drive assembly 16, and preferably rearward of the drive wheel axis of rotation C-DW. The connection between support post 27 and frame 24 may be the location at which the load from chair assembly 14 and the passenger is transmitted to frame 24. Battery housing 26, and thus batteries 82 or other power source, preferably is disposed substantially, and preferably entirely, rearward of drive wheel axis C-DW, and preferably substantially, and more preferably entirely, rearward of the support post 27 connection to frame 24. Also, the invention encompasses the center of gravity of batteries 82 or other power source being located rearward of the support 27 connection and/or rearward of drive wheel axis C-DW.

The generally rearward position of battery housing 26 and/or the capability of seat 30 to move forward (by the mechanisms 32 or 32' or any other mechanism) enables access to the batteries without fully removing seat 30. In this regard, the wheelchair cover, which typically covers the batteries and mechanical components, may be removable or configured with a hatch (not shown in the figures) to enable direct access to the batteries. Whether the seat is moveable or is fixed, the configuration of wheelchair 10 enables batteries to be accessed from the behind the drive wheels, and preferably from the rear center (that is, the 6 o'clock position when viewed from above). When the seat is slideable forward or fixed (the latter configuration is not shown in the Figures), a technician may access the batteries while the wheelchair driver remains in the seat. This function enables only one technician to make a sales call to a wheelchair owners home, rather than requiring additional people to help the driver from the seat. As the present invention generally encompasses structures in which the batteries are not accessible from behind the drive wheels, no aspect of the present invention is limited to enabling access to batteries 82 as described herein, unless such limitation is expressly recited in the claim.

The loads borne by frame 24 are transmitted to the ground via drive wheels 58, front casters 66, and rear casters 76. As will be clear to people familiar with wheelchair design, the location of pivot 29 will affect the weight distribution of wheelchair 10. In this regard, the position of pivot 29 forward of drive wheel axis C-DW causes front casters 66 to bear a vertical load while wheelchair 10 is at rest, as mounting plate 56 is supported by drive wheel 58 via its axle. Configuring the wheelchair such that front casters 66 bears a vertical load during steady-speed operation on level ground and/or while at rest on level ground may, in some circumstances, enhance the stability and stable feel of a wheelchair, although load-bearing casters are not required.

In the preferred embodiment illustrated in the figures, the position of pivot 29 may be chosen to achieve the desired weight distribution and the desired downward load borne by front casters 66. The weight distribution and magnitude of load borne by the casters may be chosen according to such parameters as desired stability of the particular wheelchair during operation on level ground and while ascending and descending a step, motor torque and horsepower, other wheelchair dimensions (such as the horizontal distance from drive wheel axis C-DW to the rear casters), overall wheelchair weight, and like parameters.

For the wheelchair 10 shown in FIGS. 1-4, pivot axis 29 preferably is spaced apart from the front wheel axis by a horizontal dimension that is between 40% and 65%, more preferably between 45% and 60%, and even more preferably about 54% of the horizontal dimension between drive wheel axis C-DW and the front caster axis. Pivot axis 29 may be spaced apart from front wheel axis C-RC by less than or about 30% of the distance between the drive wheel axis and the front caster axis. Front casters 66 bear approximately 30% of the wheelchair load. A "horizontal" dimension or distance, when referring to pivot position, is measured parallel to a level ground plane in a direction of straight-ahead travel of the wheelchair (that is, perpendicular to the drive wheel axis) while the wheelchair is at rest. A "vertical" distance or dimension, or height, when referring to pivot position, is perpendicular to a level ground plane while the wheelchair is at rest.

Conventional wheelchairs having front casters often employ springs to bias the casters. The configuration of pivot assembly 18 enables the front suspension of wheelchair 10 to function without a spring bias on caster 66 because of the downward force applied to casters 66 described above. Forgoing biasing springs in the anti-tip wheels eliminates the step of adjusting spring bias for the weight of the wheelchair occupant. The present invention, however, is not limited to wheelchairs lacking springs, regardless of the type of front wheels employed.

Referring to FIG. 6A to illustrate a preferred horizontal relationship of some components, drive wheel axis C-DW has a height H1, a centerline of pivot 29 defines a pivot axis C-P that has a height H2, and a centerline of front caster 66 defines a front caster axis C-FC that has a height H3. Preferably, front caster axis height H3 is approximately the same as or more than pivot axis height H2. The inventors believe that it is advantageous for pivot axis height H2 to be approximately below a line drawn between the drive wheel axis and axis of rotation of front caster 66.

Referring again to FIG. 6A to illustrate operation of wheelchair 10 while ascending from a level ground surface 200 up a curb, such as a step 201 having a face 202, a corner 203, and an upper surface 204. Wheelchair 10 may be driven forward until front caster 66 contacts face 202 or, as shown in FIG. 6A, corner 203. Applying torque to drive wheels 58 urges front caster 66 against corner 203. For a step height H4 that is less than front caster axis height H3, front caster 66 overcomes step 201 because of a force couple created by horizontal components of the driving force of wheelchair 10 and a reaction force from step 201. Also, in embodiments in which the front caster height H3 is greater than pivot height H2, a vertical, upward component of the reaction force or impulse applied at the wall tends to raise caster 66 (even if the height of curb face 202 is greater than the caster radius). This upward force also enables or enhances wheelchair 10 to overcome a step having a height that is approximately the same as caster axis height H3.

Figure 6B:
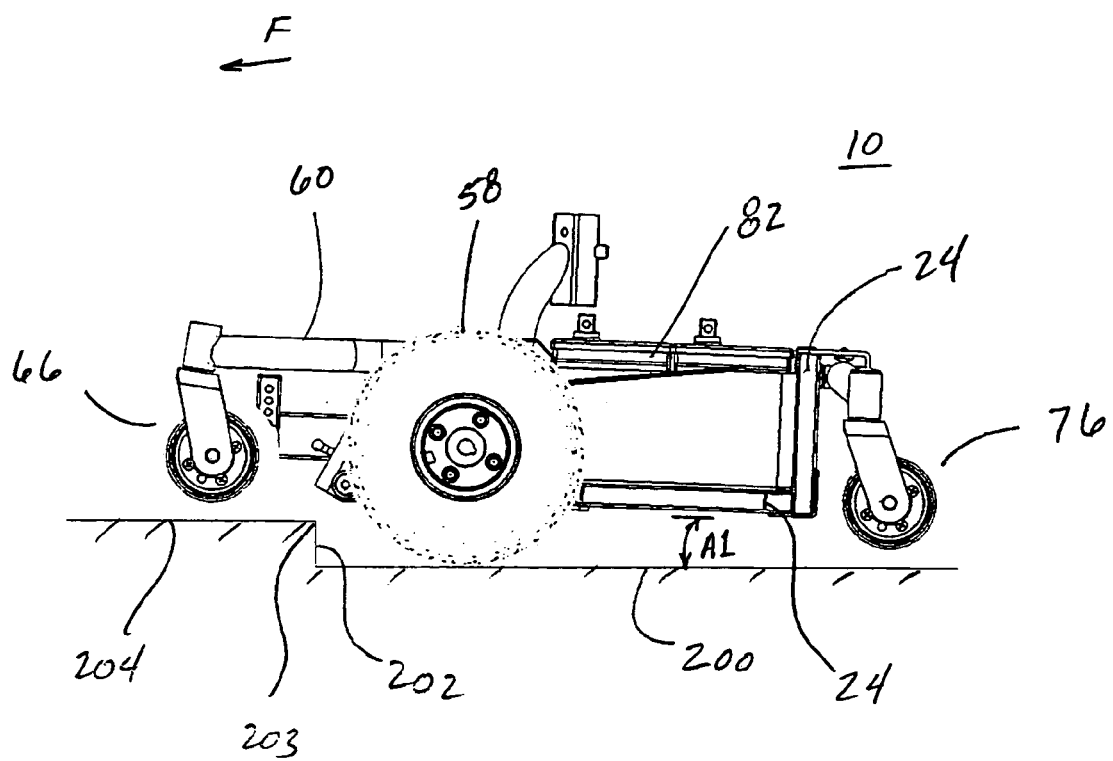
FIG. 6B is a side view of the wheelchair shown in FIG. 6A illustrating the wheelchair ascending a curb.

FIG. 6B illustrates the partially ascended position in which front caster 66 is disposed on step upper surface 204 while drive wheel 58 and rear caster 76 are disposed on ground surface 200. Front arm 60 and mounting plate 56 have been pivoted clockwise (as oriented in FIG. 6B) from the at-rest position in which all six wheels are in contact with ground surface 200. In the position shown in FIG. 6B, frame 24 of wheelchair 10 tips slightly upward from its at rest position, as mounting plate 56 pivots—clockwise as oriented in FIG. 6B—about drive wheel axis C-DW. In this regard, front arm 60 pivots as caster 66 moves from ground surface 200 to step upper surface 202, and the corresponding pivoting of mounting plate 56 about drive wheel axis C-DW results in a corresponding pivoting of pivot 29 about drive wheel axis C-DW. Upward movement of pivot 29 results in a upward movement of the forward portion of frame 24. For the embodiment shown in FIG. 6B, frame 24 tips by an angle A1 of approximately 2.5 degrees upon front caster 66 initially touching lower surface 212.

FIG. 6C illustrates wheelchair 10 in the process of descending a step 210, which includes a face 211 and a lower surface 212. Front caster 66 is shown on the lower surface 212 of the step and drive wheels 58 and rear wheels 76 are on the ground surface 200. As caster 66 is driven over the lip of step 210, front caster 66 is urged from the upper surface 100 to the lower surface 212 by the downward force from frame 24 transmitted to plate 56 via pivot 29.

In the position shown in FIG. 6C, frame 24 of wheelchair 10 tips slightly forward from its at rest position, as mounting plate 56 pivots—counterclockwise as oriented in FIG. 6C—about drive wheel axis C-DW. In this regard, front arm 60 pivots as caster 66 moves from step upper surface 200 to step lower surface 212, and the corresponding pivoting of mounting plate 56 about drive wheel axis C-DW results in a corresponding pivoting of pivot 29 about drive wheel axis C-DW. Downward movement of pivot 29 results in a downward movement of the forward portion of frame 24. For the embodiment shown in FIG. 6C, frame 24 tips by an angle A2 of approximately 3 degrees upon front caster 66 initially touching lower surface 212.

The present invention encompasses a wheelchair having one or both of the vertical and horizontal pivot locations described herein, which will be referred in this and the following two paragraphs as a low pivot and a forward pivot, respectively. In general, low pivots may have been disfavored because of the need for clearance over the ground, even when the ground is uneven. Further, the pivot must clear an obstacle, such as a curb, during climbing, which may require lifting the frame at the pivot by a change in height that is greater than if the pivot was at a higher location. Further, considering lifting of the front pivot, forward pivot locations may have been disfavored because of diminished mechanical advantage of forward pivot positions.

For configurations in which the pivot axis C-P is below the caster axis C-FC, a force applied through the wheelchair via front caster 66 onto vertical obstacle face 22 creates an upward component of the force vector by the nature of the orientation of the pivots C-P and C-FC. This upward component of force may be helpful for ascending especially high obstacles, as explained above. The low pivot also aids even in circumstances in which the pivot axis C-P is at the same height or slightly higher than caster axis C-FC by keeping the downward component of the force near zero or small, such that motor torque may be used to climb the obstacle.

The configuration described herein, with any combination of low pivot, forward pivot, rigid coupling together of the drive assembly and front arm, transverse drives, and rear battery location provides a combination of beneficial wheelchair stability and curb climbing capabilities. The configuration shown naturally has good forward stability (that is, wheelchair 10 does not easily tip forward), and the rear articulating transverse beam enhances rearward stability (especially backwards tipping) compared with separately sprung rear arms.

Some aspects of the present invention depend on neither the low pivot nor the forward pivot, and the present invention should not be construed to require either or both of a low pivot or forward pivot unless the structure is explicitly stated in the claim. Nor should the present invention be construed to require any other feature disclosed herein, even if the specification emphasizes its advantages, unless the structure is explicitly stated in the claim.

FIGS. 7A, 7B, 8A, 8B, and 9 illustrate the second embodiment, in which a wheelchair 10' includes a frame assembly 12', a chair assembly 14', a drive assembly 16', a front pivot assembly 19, and a rear wheel assembly 20'. Structure of wheelchair 10' that corresponds to structure of the first embodiment wheelchair 10 is designated with a prime (') symbol after the reference numeral. Chair assembly 14' is essentially the same as the chair assembly 14 shown in FIGS. 1-5 and 11-13, and rear wheel assembly 20' is essentially the same as rear wheel assembly 20 shown in FIGS. 1-5. Accordingly, descriptions of chair assembly 14' and rear wheel assembly 20' are omitted from the description of second wheelchair embodiment 10'.

Figure 7B:
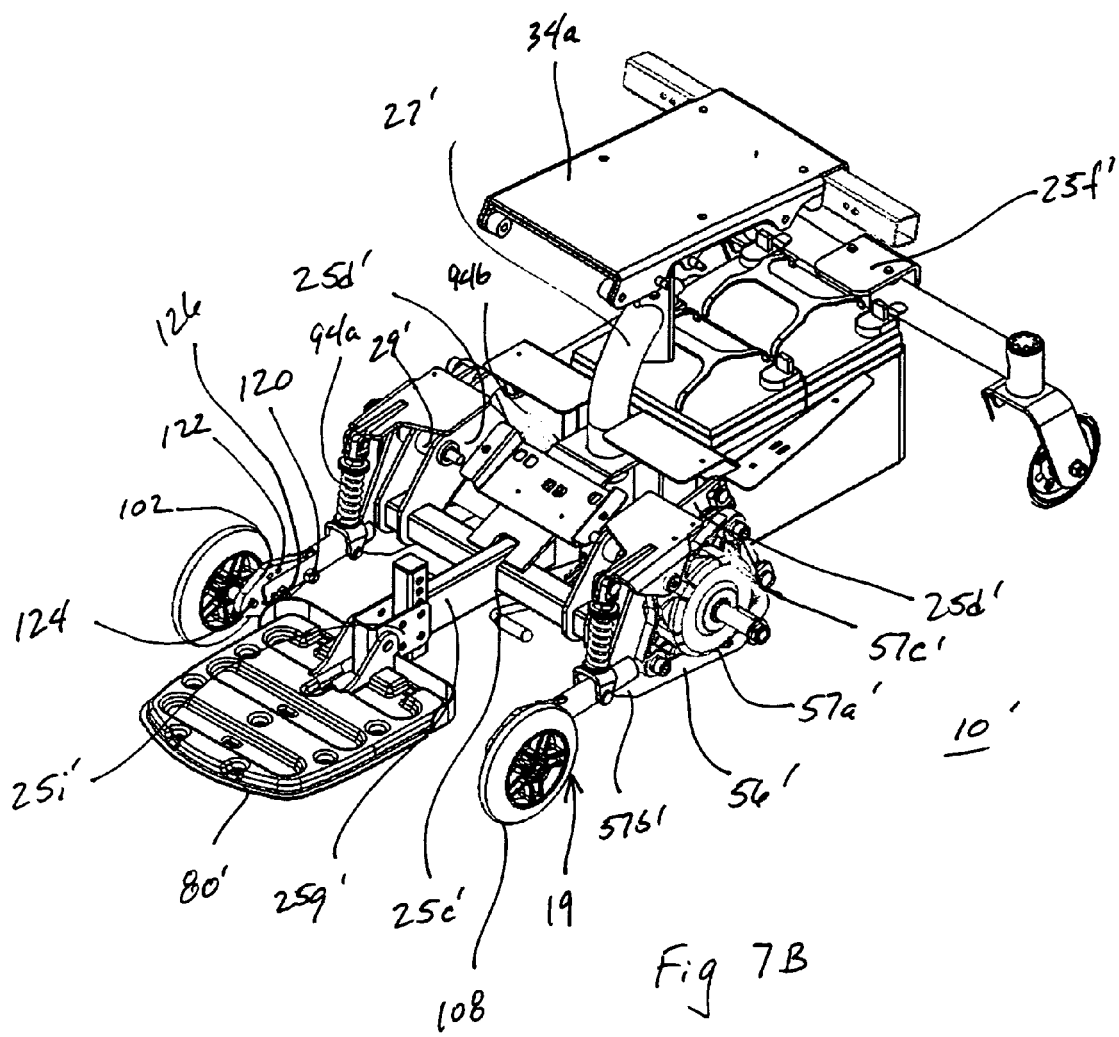
FIG. 7B is a perspective view of the wheelchair of FIG. 7A with the drive wheels and a portion of the mounting plate removed.

Frame assembly 12' in the embodiment shown in FIGS. 7A and 7B is a rigid, box-like structure that is formed of welded and/or bolted square and round tubing and formed plates. The frame structure, which is generally referred to herein by reference numeral 24', includes a central support 25a', a rear support 25b', a T-shaped support 25c', a pair of pivot supports 25d', and a footrest support 25e'.

Figure 8A:
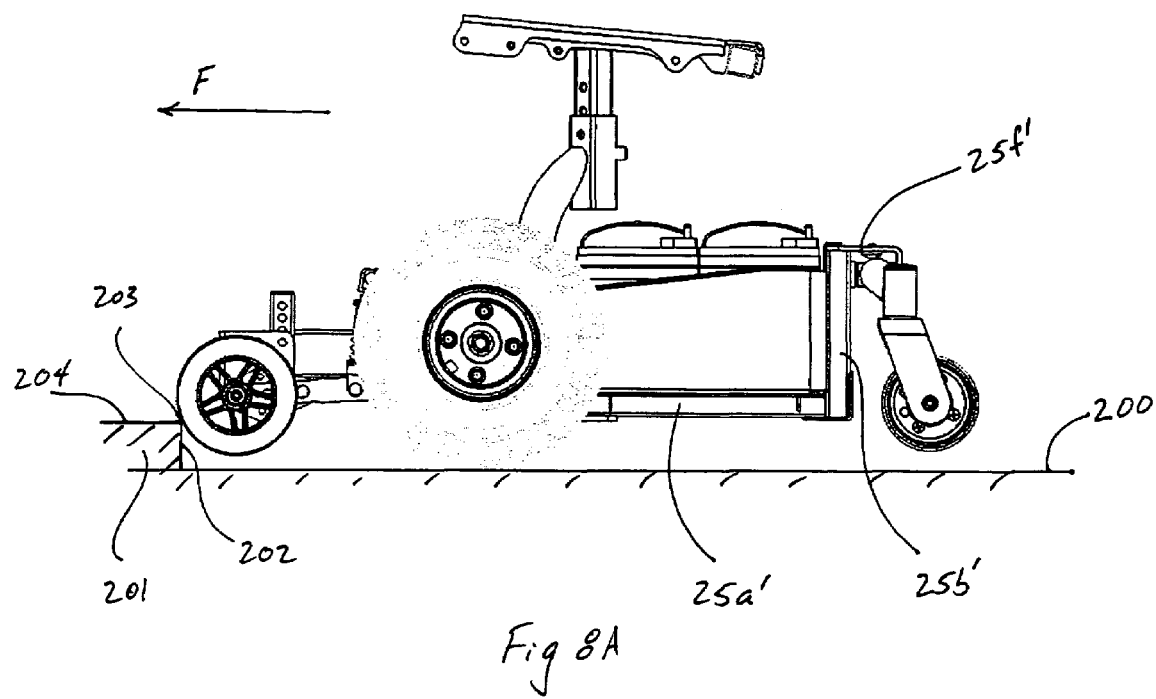
FIG. 8A is a side view of the wheelchair shown in FIG. 7A.
Figure 8B:
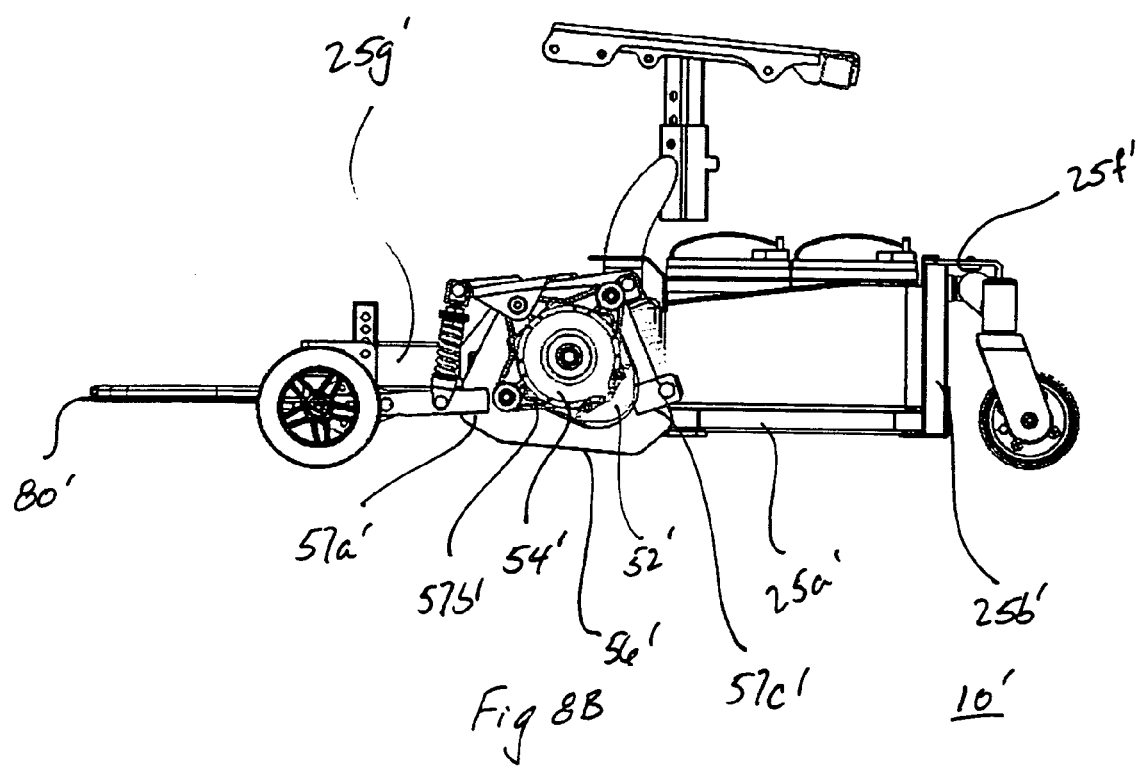
FIG. 8B is a side view of the wheelchair shown in FIG. 7A with the drive wheel and a portion of the mounting plate removed.

Central support 25a', which is best shown in FIGS. 8A, 8B, and (schematically in dashed lines) FIG. 9, is disposed along a horizontal centerline of the wheelchair 10'. Rear support 25b', which is shown in FIG. 9, extends upwardly from a rear portion of central support 25a' and includes a mounting plate 25f. T-shaped support 25c' is disposed above and forward of central support 25a' and includes a longitudinal portion 25g' and a pair of transverse supports 25h'. Pivot supports 25d' preferably are substantially vertical plates that extend generally upwardly from transverse supports 25h'. Footrest support 25e' is disposed at a forward end of longitudinal portion 25b of T-shaped support 25c. A footrest 80' is coupled to footrest support 25e'. A housing 26' for holding batteries 82' and a support post 27' are generally the same as described above with respect to first embodiment wheelchair 10.

Drive assembly 16' of second embodiment wheelchair 10' includes a pair of drives 50', each of which includes a motor 52' and a gearbox 54', a mounting plate 56', and a pair of drive wheels 58'. Motor 52' preferably is oriented with its centerline (that is, the central axis of its output shaft) parallel to the output shaft of gearbox 54', which is coupled to a drive wheel 58' as shown in the figures. A longitudinal centerline of the output shaft of gearbox 54' is collinear with the drive wheel rotational axis, which is designated C-DW. Motor 52' may be oriented such that its centerline is collinear with or—as shown in the figures—is parallel to, but offset from, drive wheel rotational axis C-DW and the output shaft of gearbox 54'. Accordingly, drives 50' preferably are mounted transverse to the direction of translation of the wheelchair. The forward direction of wheelchair translation is indicated in FIG. 8A by arrow F. Also, the present invention encompasses motors 52' having a centerline (that is, the central axis of its output shaft) that is not parallel to the drive wheel rotational axis C-DW unless such relationship is explicitly set forth in the claims.

Drive 50' is rigidly affixed to mounting plate 56'. Mounting plate 56' is pivotally connected to pivot support 25d' by pivot 29', as best shown in FIGS. 7A and 7B. Mounting plate 56' preferably is planar and oriented perpendicular to rotational axis C-DW of drive wheels 58'. Mounting plate 56' includes a motor-mounting portion 57a' to which drive 50' is bolted, a front projection 57b' that extends forward from mounting portion 57a', and a rear projection that extends rearward from mounting portion 57a'. As explained more fully below, front projection 57b' provides a surface for the attachment of the arm of pivot assembly 19; rear projection 57c' provides a surface for attachment of a bracket to which a spring is mounted.

Pivot assembly 19 includes a forward-extending front arm, such as fixed wheel or anti-tip wheel arm 90, and a suspension assembly 91. Arm 90 includes a front end 92a to which an adjustment plate 102 is connected and a rear end 92b that is affixed to front projection 57b'.

Adjustment plate 102 includes a pivotable connection 120, holes 122 formed through plate 102, and a bearing mounting 124 to which a front wheel 108 is attached. A bolt or pin 126 extends horizontally through arm front end 92a and through one of holes 122. The height of wheel 108 may be adjusted by removing pin 126, pivoting plate 102 up or down to a desired position, and replacing pin 126 into another one of holes 122. The height of wheel 108 may be adjusted to be closely spaced apart from ground plane surface 200 or adjusted such that the rotational axis of wheel 108 is higher than an expected curb height. In general, the purpose, procedure, and desired position for adjusting the height of anti-tip wheels 108 will be understood by persons familiar with wheelchair technology. Adjustment plate 102 is shown for illustration, and the present invention is not limited to wheelchairs having a front wheel height adjustment nor to a particular configuration of a height adjustment mechanism.

Suspension assembly 91 preferably includes a front spring 94a and a rear spring 94b. Front spring 94a has an upper end that is pivotally connected to a mounting bracket 96a that extends from an upper portion of pivot support 25d'. A lower end of spring 94a is pivotally connected to an intermediate portion of arm 90 between arm front end 92a and arm rear end 92b, and thus spring 94a acts on arm 90 forward of mounting plate 56' and rearward of adjustment plate 102. Rear spring 94b has an upper end that is pivotally connected to a mounting bracket 96b that extends rearward from pivot support 25d' and a lower end that is pivotally connected to a rearward portion 57c' of mounting plate 56'. Preferably, front spring 94a includes a threaded rod and adjustment nut 128 to adjust the spring force and height of spring 94a.

Figure 10:
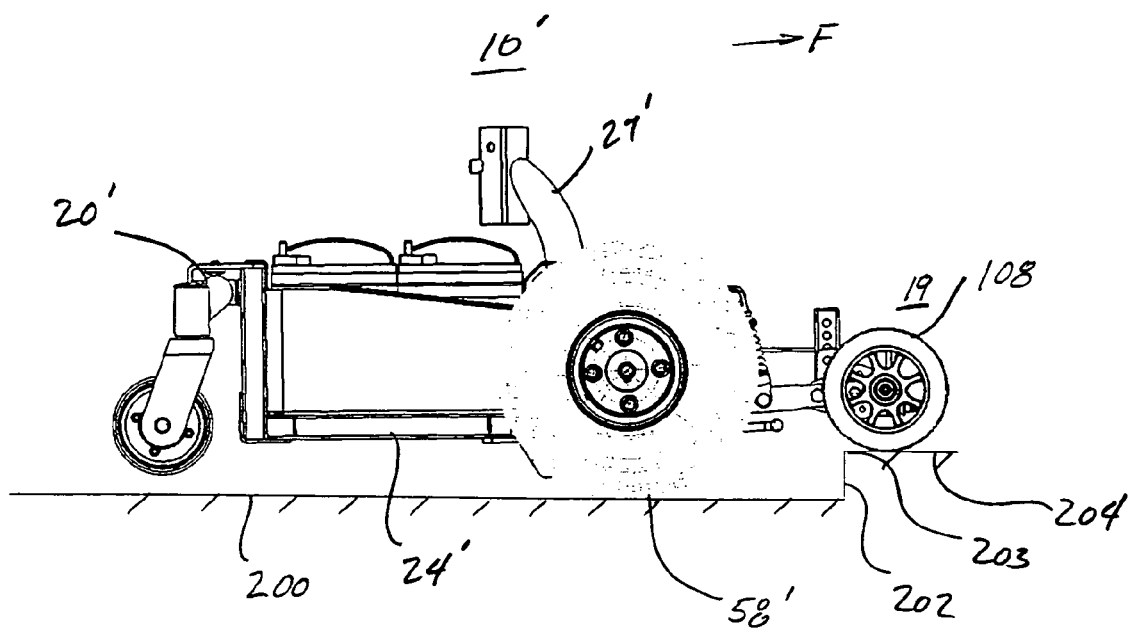
FIG. 10 is a side view of the wheelchair shown in FIG. 7A illustrating the wheelchair ascending a curb.

Springs 94a and 94b each resist pivoting of mounting plate 56' because of weight of frame 24' and thus position mounting plate 56' and position arm 90. Also, each spring 94a and 94b resists pivoting of mounting plate 56' in response to contact with an obstacle. In this regard, FIG. 10 illustrates the operation of wheelchair 10' as it encounters a corner 203 of curb 201. Because the height of the axis of fixed wheel 108 is greater than the height of curb 201, wheel 108 rides over curb 201 when urged forward by the wheelchair drive 50'. Arm 90 and mounting plate 56' rotate clockwise (as oriented in FIGS. 8A and 8B) until wheel 108 overcomes corner 203 to reach upper surface 204. Wheelchair 10' continues moving forward until drive wheels 58' contact and overcome curb 201.

Upon initially mounting or ascending curb 201, frame 12' preferably tilts slightly upward. The position of the pivoting connection 29' may be chosen to cooperate with the operation of wheel 108 and drive wheels 58', as will be understood by persons familiar with wheelchair design and configuration in view of the present disclosure. Also, the position of pivot connection 29' enhances the capability of arm 90 of wheelchair 10' to rise relative to the ground in response to an increase in motor torque and/or to wheelchair acceleration. Front casters 66 of first embodiment wheelchair 10 generally remain in contact with the ground surface in response to most applications of motor torque and/or acceleration. The present invention, however, is not limited by the capability or lack of capability of the arms, such as arms 60 or 90, raising in response to application of motor torque, acceleration, or like operations.

The spatial relationship between support post 27', drive motors 52', and batteries 82' is the same as described above with respect to first embodiment wheelchair 10. Accordingly, the capability of chair 30' to move forward enables or enhances access to batteries 82' without fully removing chair 30' from frame 24', as explained more fully above.

The description of wheelchairs 10 and 10' and their respective subsystems is for illustration purposes, and the present invention is not intended to the particular descriptions provided herein, nor is the designation of parts into particular subsystems intended to limit the scope of the invention in any way. For example, the description of the frame assembly does not limit the scope of the invention to devices having a rigid frame, but rather the invention encompasses all frame structures, including those having flexible or movable structure; describing the hinge assembly as a portion of the chair assembly should not be construed to limit the invention to such structure; and describing components of the wheelchair as part of the pivot assembly is not intending to be limiting. Further, the hinge assembly structure and slide assembly structure for moving the seat, the frame structures, the chair assembly structure, the drive assembly structures, the pivot assembly structures, and rear beam structure are described herein for illustration purposes, and are not intended to limit the scope of the invention except for the particular structure that is explicitly recited in the claim.

We claim:

1. A wheelchair comprising:
a frame;
a pair of drive wheels and at least one rear wheel;
a drive operatively coupled to each drive wheel, each one of the drives including a motor and a gearbox;
a pair of forward-extending, front arm rigidly coupled to each drive such that each one of the drive and front arm structures is pivotally coupled to the frame only at a single pivot axis; and
a front wheel rotatably coupled each front arm, the centerline of the pivot axis of each arm having a vertical height that is less than the vertical height of the axis of rotation of the corresponding front wheel when the drive wheels and front wheels are on level ground, whereby motor torque biases the front wheels when encountering an obstacle.

2. The wheelchair of claim 1 wherein the drive includes a drive mount to which the gearbox is rigidly coupled, the drive mount is coupled to the frame at the pivot axis.

3. The wheelchair of claim 2 wherein the drive mount is a mounting plate to which the gearbox and the front arm are affixed.

4. The wheelchair of claim 2 wherein the drive mount includes a substantially-upright planar surface.

5. The wheelchair of claim 4 wherein the planar surface of the drive mount is substantially perpendicular to an axis of rotation of the drive wheels.

6. The wheelchair of claim 1 wherein each one of the drives has a longitudinal centerline that is parallel to an axis of rotation of the corresponding drive wheel.

7. The wheelchair of claim 1 wherein the front wheel is a castor such that the castor is in contact with a support surface while the wheelchair is at rest.

8. The wheelchair of claim 7 wherein the front arm is not biased by a spring.

9. The wheelchair of claim 1 wherein the front wheel is an anti-tip wheel such that the anti-tip wheel, in its rest position, is spaced apart from a support surface.

10. The wheelchair of claim 9 wherein the anti-tip wheel is supported by a spring in its rest position.

11. The wheelchair of claim 9 wherein at least one spring is coupled between the frame and one of the drives, the spring suspending the anti-tip wheel in its rest position.

12. The wheelchair of claim 1 wherein each drive is oriented substantially transverse to the direction of wheelchair translation.

13. The wheelchair of claim 12 wherein the wheelchair further comprises a power source for supplying power to the motor, the power source being disposed to the rear of the drives.

14. The wheelchair of claim 13 wherein the entire power source is disposed to the rear of the centerline of the drive wheel axis.

15. The wheelchair of claim 13 wherein essentially every portion of the power source is disposed to the rear of the drives.

16. The wheelchair of claim 13 wherein the power source is batteries.

17. The wheelchair of claim 13 further comprising a power source compartment disposed in the frame, the power source compartment is disposed to the rear of the drives.

18. The wheelchair of claim 17 wherein the power source is batteries and the power source compartment is a battery compartment.

19. The wheelchair of claim 13 wherein the weight of the chair assembly is transmitted to the frame at a point between the drives and the power source.

20. The wheelchair of claim 1 wherein the pivot axis is disposed forward of the axis of rotation of the drive wheels.

21. The wheelchair of claim 1 wherein the pivot axis is spaced apart from the front wheel axis by a horizontal dimension that is between 40% and 65% of the horizontal dimension between the drive wheel axis and the front castor axis.

22. The wheelchair of claim 21 wherein the pivot axis is spaced apart from the front wheel axis by a horizontal dimension that is between 45% and 60% of the horizontal dimension between the drive wheel axis and the front castor axis.

23. The wheelchair of claim 21 wherein the pivot axis is spaced apart from the front wheel axis by a horizontal dimension that is approximately 54% of the horizontal dimension between the drive wheel axis and the front castor axis.

24. The wheelchair of claim 1 wherein the pivot axis is located forward of the drive wheel axis, whereby the front castors bear between 20% and 50% of the wheelchair load measured with the chair at rest on a level, flat surface without a passenger.

25. The wheelchair of claim 1 wherein the gearbox is a single reduction gearbox.

26. A method of ascending an obstacle in a powered wheelchair, comprising the steps of:
(a) providing a wheelchair that includes:
a frame;
a pair of opposing drive wheels and at least one rear wheel;
each side of the wheelchair including:
a drive including a motor and a gearbox, the drive being operatively coupled to a drive wheel;
a forward-extending, front arm rigidly coupled to the drive such that each one of the drive and front arm structures is pivotally coupled to the frame only at a single pivot axis; and
a front wheel rotatably coupled the front arm, a centerline of the pivot axis has a height that is less than the vertical height of an axis of rotation of the front wheels when the drive wheels and front wheels are on level ground; and
(b) positioning the wheelchair such that the front wheels are in contact with or in close proximity to an obstacle that has a height measure from a support surface that is approximately equal to or less than the height of the front wheel axis of rotation; and
(c) urging the wheelchair forward to enable the front wheels to ascend the obstacle.

27. The method of claim 26 wherein the urging step includes applying a forward, horizontal force from the wheelchair drive that forms a moment with the reaction force from a contact surface of the obstacle, thereby enabling the front wheels to ascend the obstacle.

28. The method of claim 26 wherein the obstacle is a curb.

29. The method of claim 26 wherein the pivot axis moves upwardly as the front wheel ascends the obstacle.

30. The method of claim 26 wherein the frame pitches upwardly as the front wheel ascends the obstacle.

31. The method of claim 30 wherein after the urging step (c) and after the front wheel has ascended the obstacle and before the drive wheel has ascended the obstacle, the frame is pitched rearward compared to its position in position step (b).

32. A wheelchair comprising:
a frame;
a pair of opposing drive wheels;
a pair of pivoting assemblies, each one of the pivoting assemblies associated with one of the drive wheels and including a drive assembly and a front arm assembly,
each drive assembly (i) including a motor and gearbox that are transversely mounted relative to the frame, (ii) operatively coupled to one of the drive wheels, and (iii) pivotally connected to the frame,
each front arm assembly including a front wheel rotatably coupled to an arm, the front arm assembly is rigidly coupled to the drive assembly, whereby the drive assembly and front arm assembly pivot in unison about the pivotal connection upon encountering an obstacle.

33. The wheelchair of claim 32 wherein the front wheel is an anti-tip wheel.

34. The wheelchair of claim 33 wherein the anti-tip wheel is suspended from a ground surface on which the wheelchair travels, the wheelchair further comprising a suspension capable of acting on the arm.

35. The wheelchair of claim 32 wherein the front wheel is a castor wheel that is normally in contact with the ground surface on which the wheelchair travels.

36. The wheelchair of claim 32 wherein a centerline of a pivot axis of the pivotal connection between the drive assembly and the frame has a vertical height that is approximately the same or less than the vertical height of an axis of rotation of the front wheel.

37. The wheelchair of claim 36 wherein the motor has a longitudinal axis that is transverse relative to the frame.

38. The wheelchair of claim 36 wherein the drive assembly includes a mount to which the gearbox is affixed, the mount including a surface to which the front arm is rigidly affixed.

39. The wheelchair of claim 38 wherein the mounting is a vertical plate.

40. The wheelchair of claim 32 further comprising a battery compartment disposed rearward of the drive.

41. The wheelchair of claim 40 further comprising a chair coupled to the frame, the chair assembly is forwardly movable to enable access to the battery compartment without removing the chair from the frame.

42. The wheelchair of claim 32 wherein the gearbox is a single reduction gearbox.

43. A wheelchair comprising:
a frame;
a seat coupled to the frame;
a pair of opposing drive wheels and at least one rear wheel;
each side of the wheelchair including:
a drive including a motor and a gearbox that are transversely mounted, the drive being operatively coupled to a drive wheel; and
a forward-extending, front arm operatively coupled to the drive whereby motor torque may bias the front arm, the front arm coupled to the frame at a pivot axis;
a front wheel rotatably coupled to the front arm, a centerline of the pivot axis (i) having a height that is approximately the same or less than the vertical height of an axis of rotation of the front wheel and (ii) being horizontally spaced apart from the axis of rotation of the front wheel by no more than about 65% of the horizontal distance between the axis of rotation of the front wheel and the drive wheel axis.

44. The wheelchair of claim 43 further comprising a pivoting transverse beam located rearward of the drive wheels and having a pair of rear idler wheels coupled to opposing ends thereof.

45. The wheelchair of claim 44 wherein the centerline of the pivot axis is horizontally spaced apart from the axis of rotation of the front wheel by no more than about 50% of the horizontal distance between the axis of rotation of the front wheel and the drive wheel axis.

46. The wheelchair of claim 43 wherein the centerline of the pivot axis is horizontally spaced apart from the axis of rotation of the front wheel by no more than about 40% of the horizontal distance between the axis of rotation of the front wheel and the drive wheel axis.

47. The wheelchair of claim 43 wherein the centerline of the pivot axis is horizontally spaced apart from the axis of rotation of the front wheel by no more than about 33% of the horizontal distance between the axis of rotation of the front wheel and the drive wheel axis.

48. A wheelchair comprising:
a frame;
a seat coupled to the frame;
a pair of opposing drive wheels and at least one rear wheel;
each side of the wheelchair including:
a drive including a motor and a gearbox that are transversely mounted, the drive being operatively coupled to a drive wheel; and
a forward-extending, front arm operatively coupled to the drive whereby motor torque may bias the front arm, the front arm coupled to the frame at a pivot axis;
a front wheel rotatably coupled to the front arm, the pivot axis (i) having a height that is approximately inline or below a line extending between a drive wheel centerline and a centerline of the front wheel and (ii) being horizontally spaced apart from the axis of rotation of the front wheel by no more than about 65% of the horizontal distance between the axis of rotation of the front wheel and the drive wheel axis.

49. The wheelchair of claim 48 wherein the pivot axis height is approximately the same as or less than the vertical height of an axis of rotation of the front wheel.

50. The wheelchair of claim 48 further comprising batteries that are disposed rearward of the motors.

51. The wheelchair of claim 48 further comprising an articulating, transverse beam to which rear wheels are operatively attached.

* * * * *